United States Patent
Lo

(10) Patent No.: US 10,197,811 B2
(45) Date of Patent: Feb. 5, 2019

(54) THREE-DIMENSIONAL DISPLAY PANEL AND METHOD FOR MAKING SAME

(71) Applicant: US Technology Ltd., Chai Wan (HK)

(72) Inventor: Kwok Wah Allen Lo, Causeway Bay (HK)

(73) Assignee: 3D Media Ltd., Chai Wan (HK)

( * ) Notice: Subject to any disclaimer, the term of this patent is extended or adjusted under 35 U.S.C. 154(b) by 244 days.

(21) Appl. No.: 15/183,951

(22) Filed: Jun. 16, 2016

(65) Prior Publication Data

US 2016/0378218 A1   Dec. 29, 2016

Related U.S. Application Data

(60) Provisional application No. 62/183,983, filed on Jun. 24, 2015.

(51) Int. Cl.
| | |
|---|---|
| G02B 27/22 | (2018.01) |
| G02B 27/62 | (2006.01) |
| H04N 13/31 | (2018.01) |
| G02B 7/00 | (2006.01) |
| H04N 13/305 | (2018.01) |
| H04N 13/398 | (2018.01) |

(52) U.S. Cl.
CPC ............ *G02B 27/62* (2013.01); *G02B 7/005* (2013.01); *G02B 27/2214* (2013.01); *H04N 13/305* (2018.05); *H04N 13/31* (2018.05); *H04N 13/398* (2018.05)

(58) Field of Classification Search
CPC combination set(s) only.
See application file for complete search history.

(56) References Cited

U.S. PATENT DOCUMENTS

| | | | | |
|---|---|---|---|---|
| 2009/0052026 A1* | 2/2009 | Takagi | ............... | G02B 27/2214 359/463 |
| 2011/0141560 A1* | 6/2011 | Kim | ................... | G02B 27/2214 359/463 |
| 2014/0285642 A1* | 9/2014 | Hwang | ............. | H04N 13/0415 348/58 |
| 2017/0115786 A1* | 4/2017 | Kimura | ................. | G06F 3/0412 |

* cited by examiner

*Primary Examiner* — Van N Chow
(74) *Attorney, Agent, or Firm* — Ware, Fressola, Maguire & Barber LLP

(57) ABSTRACT

An electronic device including a display panel having an optical plate attached thereon is disclosed. The optical plate includes a parallax separation sheet to allow a user to see a 3D image displayed on the display panel, and a touch-sensing layer to allow a user to select stored items such as pictures in the electronic device or to enter information into the electronic device. A method for assembly the electronic device is also disclosed. The method uses three cameras and three monitors to check the alignment between the optical plate and display panel. In order to achieve a correct alignment, rotating device and shifting device can be used to adjust the position of the display panel relative to the optical plate.

18 Claims, 24 Drawing Sheets

Example:
Normal viewing distance ....... V : 400 mm
Inter-ocular distance............ O : 64 mm
Viewing angle ................... a : 9°
Pitch of sub-strips............. Ps : 0.1 mm
Lenticule pitch ................... w : 0.2 mm
Lenticule angle .................. A : 18°
Lenticule thickness ............. T : 1 mm
Lenticule focal point............ F : 0.64 mm
Actual lenticule pitch .......... L : 0.1997 mm  = [(V-F)/V]

Ps: 0.1x2 = 0.2

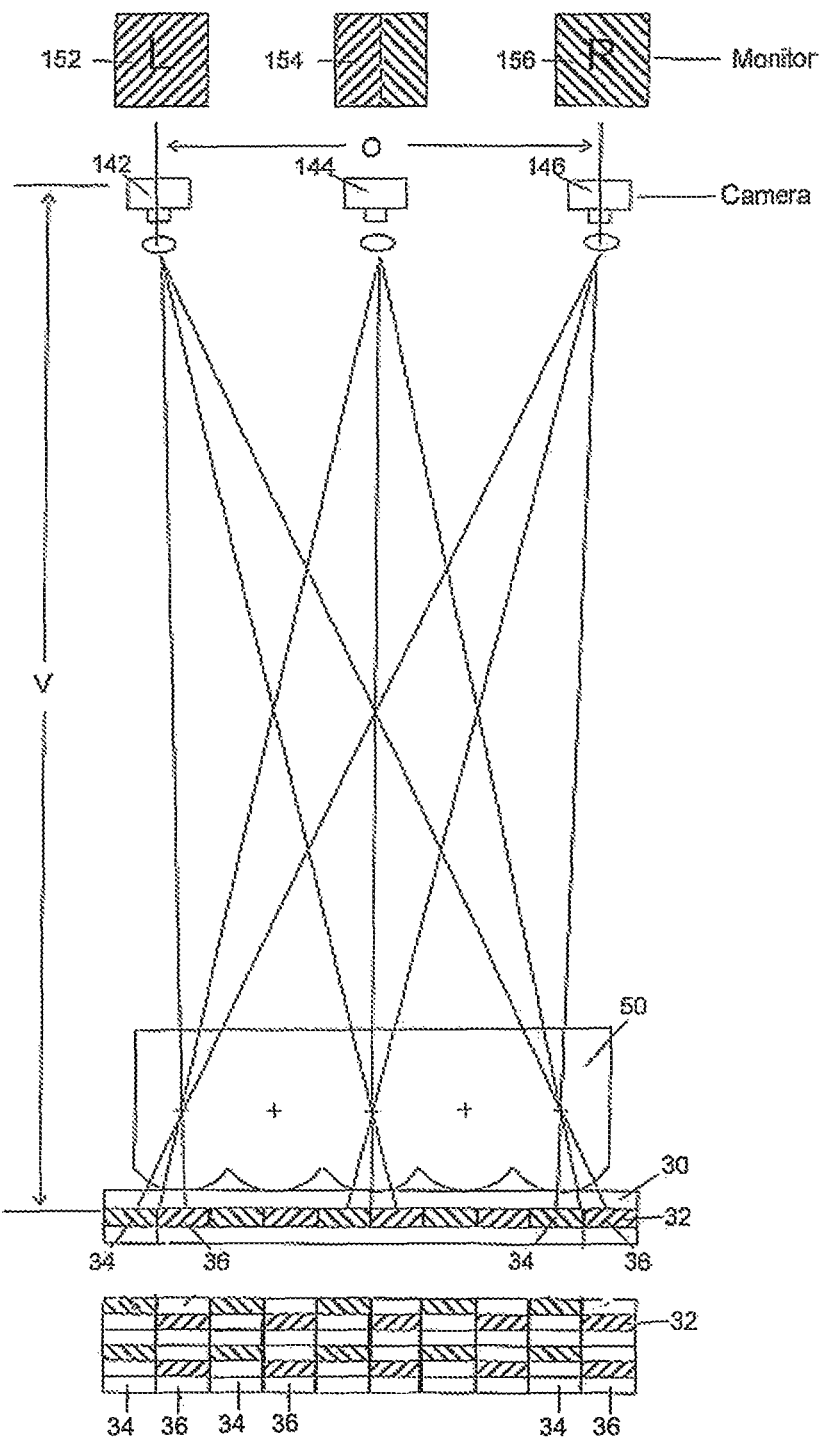

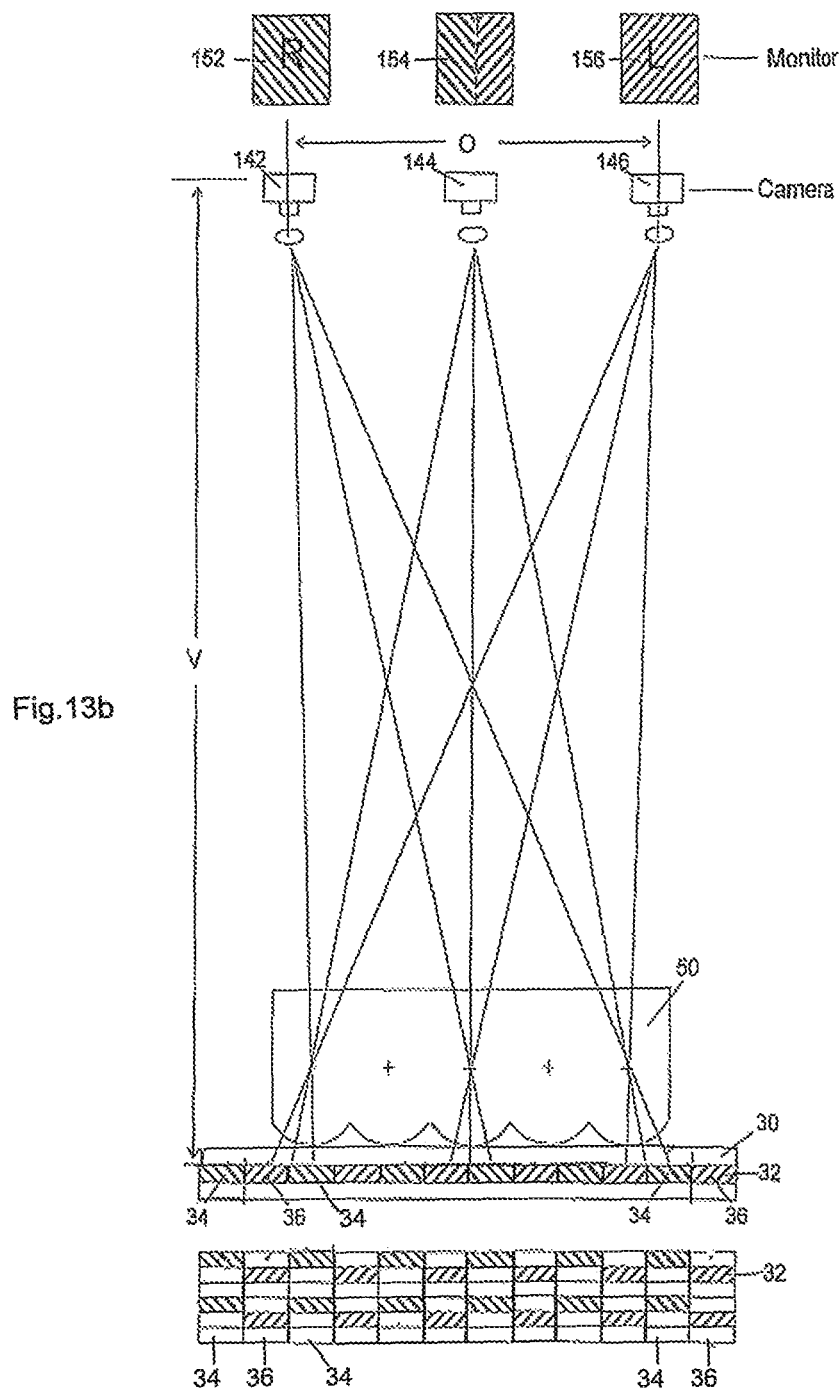

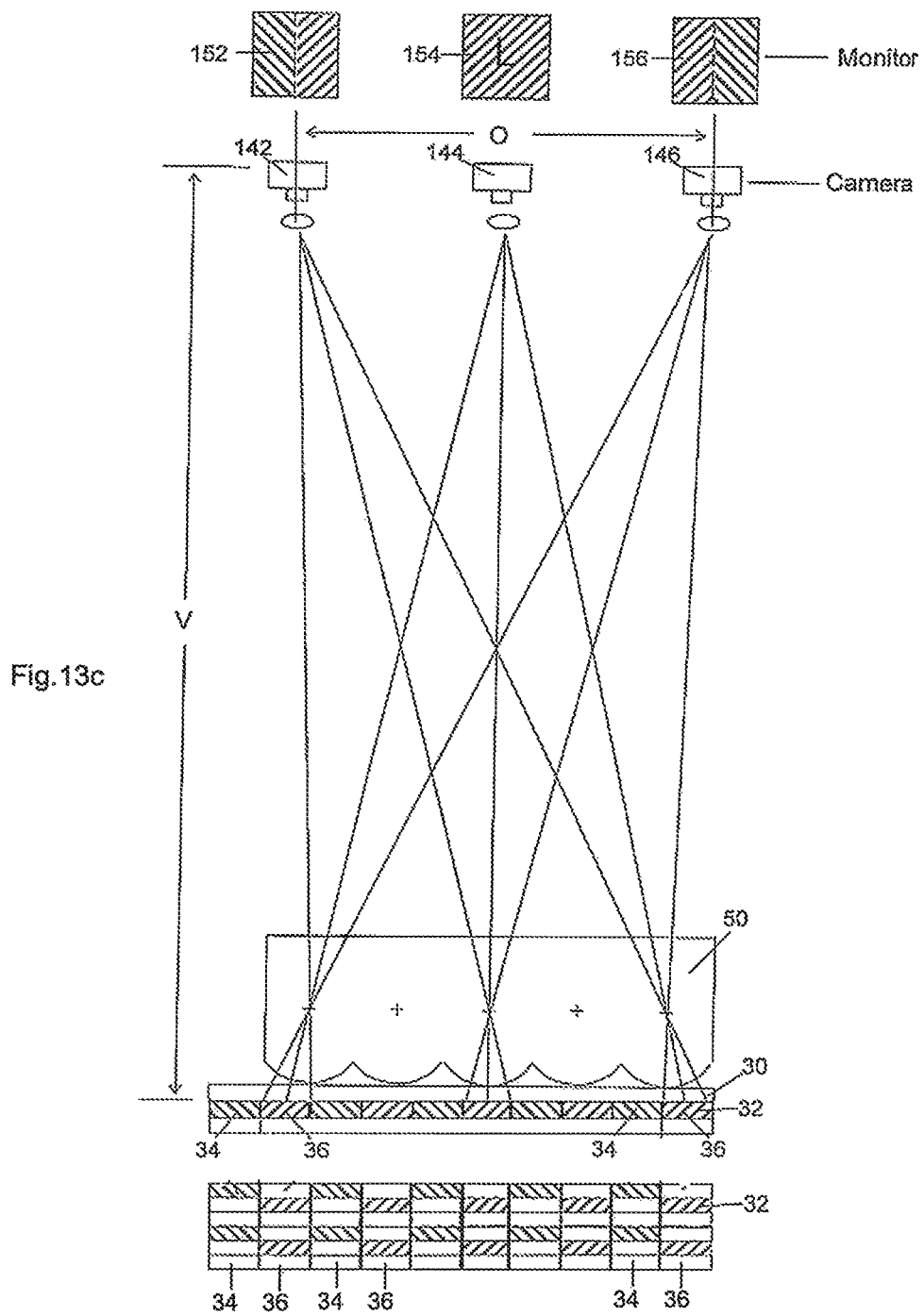

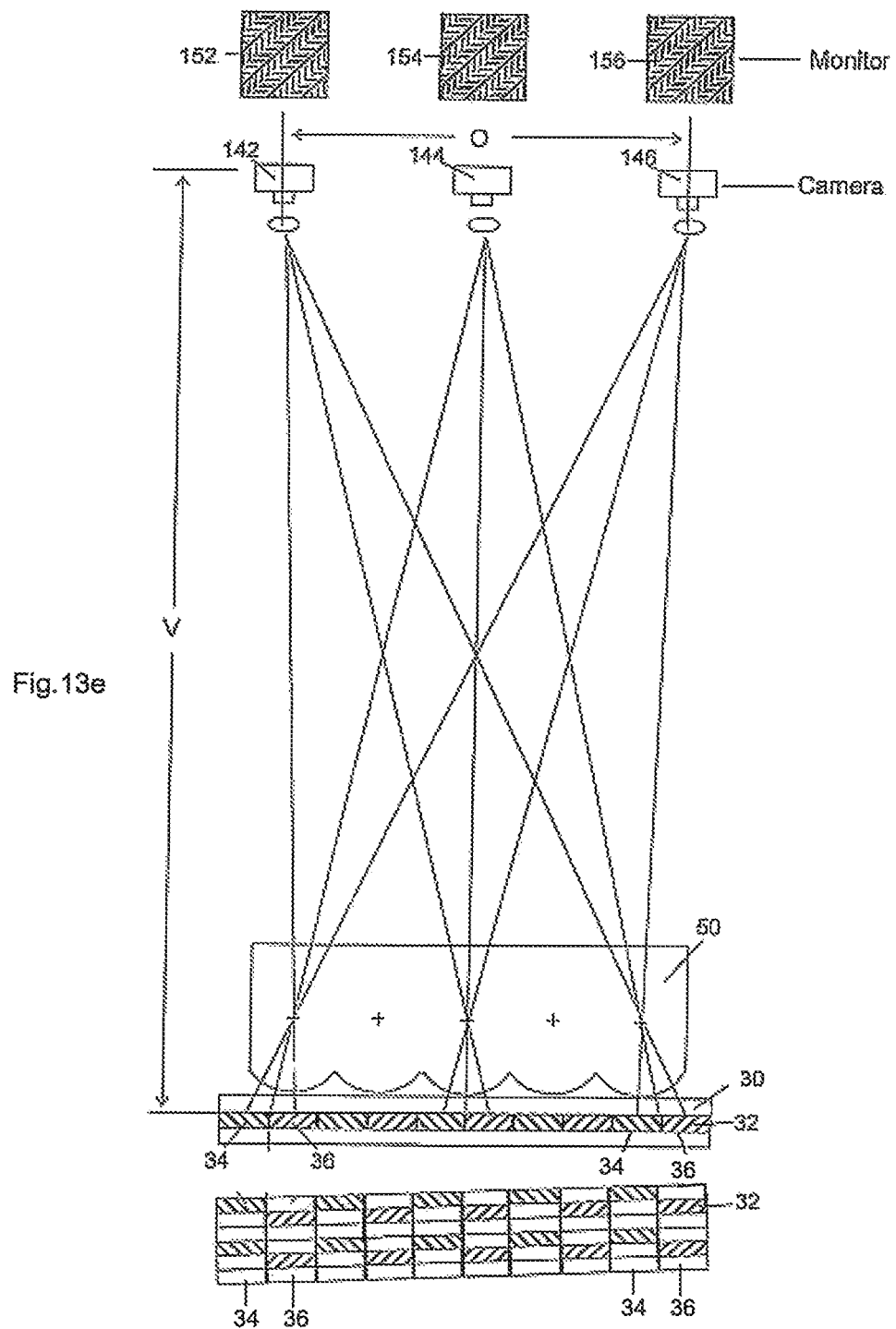

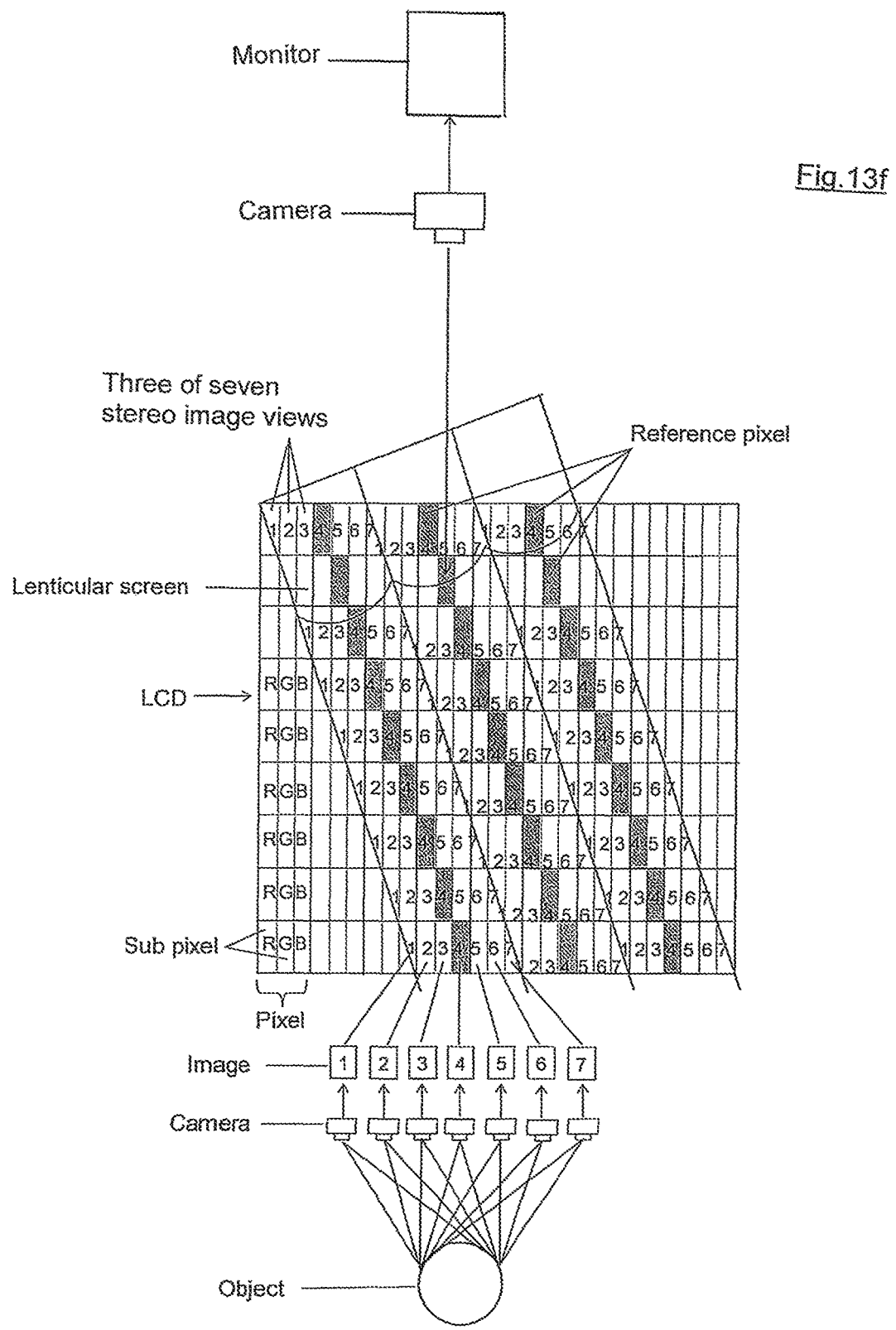

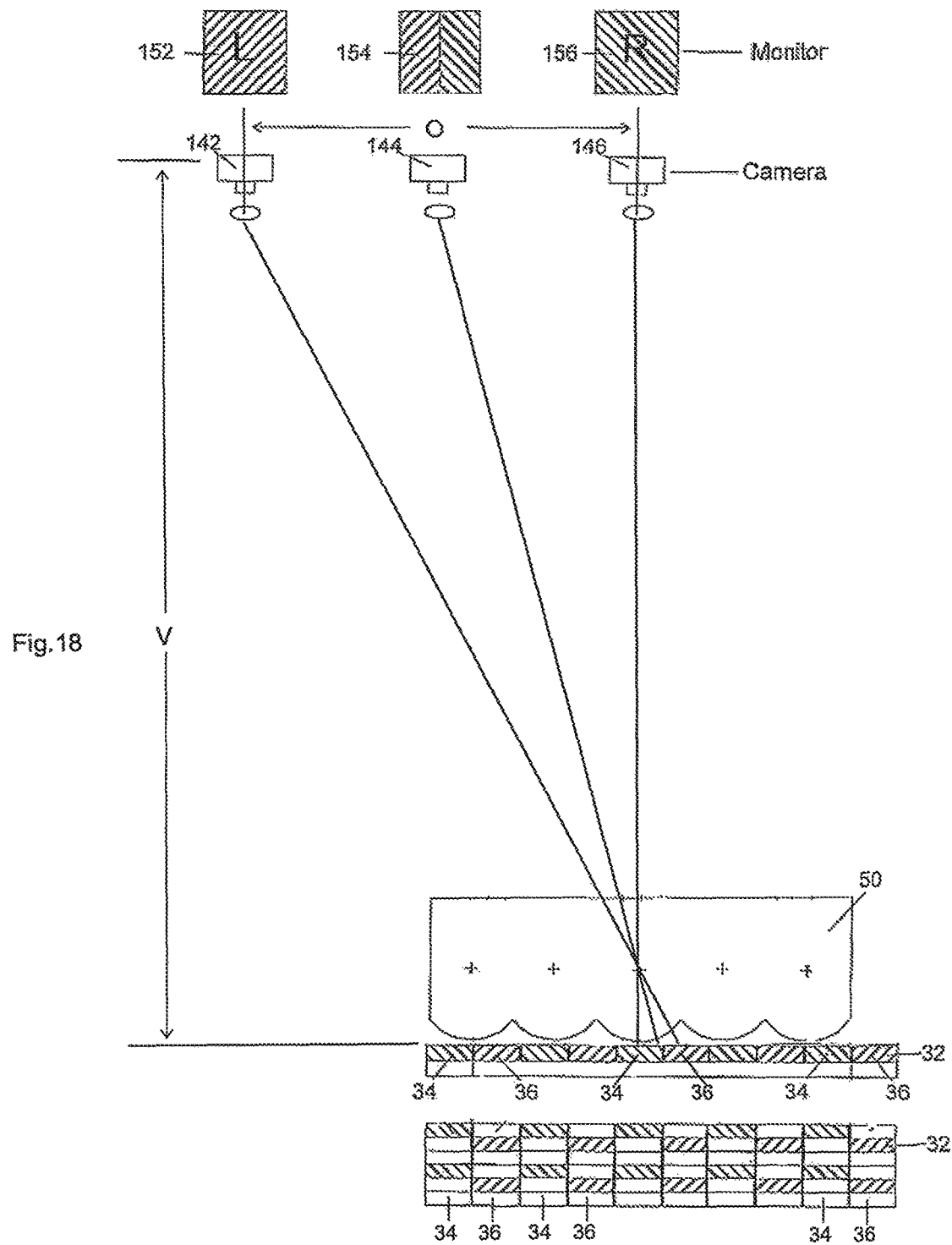

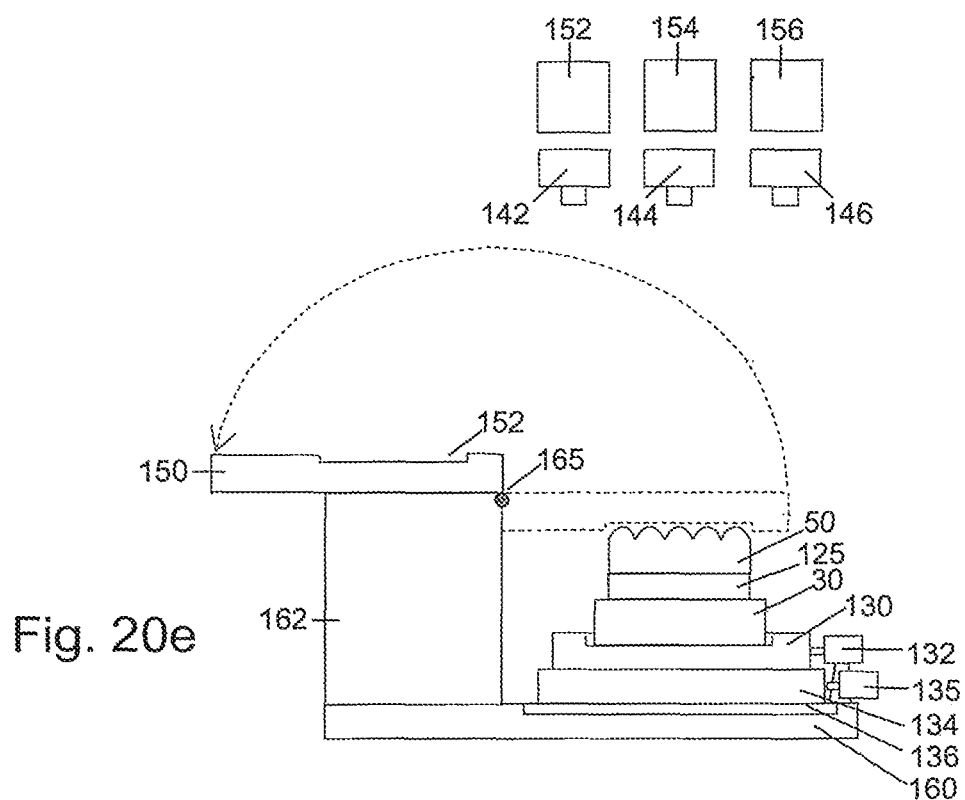

THREE-DIMENSIONAL DISPLAY PANEL AND METHOD FOR MAKING SAME

CROSS REFERENCE TO RELATED PATENT APPLICATION

This application claims priority under 35 USC § 119 to U.S. Provisional Patent Application No. 62/183,983, filed Jun. 24, 2015, whose entire contents are hereby incorporated by reference.

TECHNICAL FIELD

The present invention relates generally to an electronic device having a display panel and, more particularly, to a display panel having a touch screen or touch panel disposed on the display panel.

BACKGROUND OF THE INVENTION

A portable electronic device, such as a smart-phone, a tablet and a portable computer usually comes with a touch screen or touch panel on its display panel for touch sensing purposes. The touch screen allows a user to select stored items in the electronic device or to enter information into the electronic device, for example. The display panel is also frequently used to display pictures. It would be useful to have a display panel capable of display 3D pictures or images.

SUMMARY OF THE INVENTION

The present invention provides an electronic device including a display device having an optical plate attached thereon. The optical plate includes a parallax separation sheet to allow a user to see a 3D image displayed on the display device, and a touch-sensing layer to allow a user to select stored items such as pictures in the electronic device or to enter information into the electronic device. Thus, a first aspect of the present invention is a method for aligning an optical plate and a display panel, wherein the display panel has a display area arranged to display a picture, the picture is composed of a plurality of image strips having a strip width, the image strips arranged in parallel to each other in a first axis, each image strip having at least two sub-strips indicative of a plurality of views, and wherein the optical plate comprises a parallax separation surface having a plurality of parallax separation units, each parallax separation unit having a longitudinal axis and a unit area, the unit area having an area width substantially equal to or slightly smaller than the strip width, the method comprising:

providing a base support;

securing the display panel on the base support;

placing the optical plate on the display area of the display panel; and adjusting the display panel so that the optical plate aligns with the image strips of the display area.

According to an embodiment of the present invention, the adjusting comprises:

rotating the display panel relative to the optical plate, if necessary, so that the longitudinal axis of the parallax separation unit is substantially parallel to the first axis; and shifting the display panel relative to the optical plate, if necessary, so that the unit area of the parallax separation unit substantially covers the strip width of an image strip.

According to an embodiment of the present invention, the base support comprises a rotating plate arranged for the rotating and a shifting plate arranged for the shifting.

According to an embodiment of the present invention, the method further comprises providing a plurality of first securing posts on the base support for the securing and the adjusting.

According to an embodiment of the present invention, the method further comprises:

arranging a plurality of second securing posts for holding the optical plate; and arranging a plurality of adjustment devices provided on the second securing posts for adjusting the optical plate.

According to an embodiment of the present invention, the method further comprises:

locating a plurality of cameras positioned at a distance from the optical plate, at least two of the cameras arranged for capturing at least two of the plurality of views at two viewing angles, and wherein the picture displayed on the display panel comprises a composite image of a test pattern, such that when the parallax separation sheet is substantially aligned with the composite image, the views captured by said at least two of the cameras provide two distinguishable component patterns; and arranging a plurality of viewing devices, including two monitors for showing the views captured by said at least two of the cameras.

According to an embodiment of the present invention, each of the two distinguishable component patterns has a different color.

According to an embodiment of the present invention, the plurality of cameras further comprises a third camera positioned between said at least two of the cameras for capturing a different view of the composite image and viewing devices further comprise a third monitor for showing the view captured by the third camera.

According to an embodiment of the present invention, the parallax separation surface comprises a lenticular sheet or a parallax barrier to provide the plurality of parallax separation units.

According to an embodiment of the present invention, the optical plate has a first surface and a second surface, the first surface facing the display area, the optical plate further comprising a touch sensing layer on the second surface.

According to an embodiment of the present invention, the method further comprises:

providing a mounting platform operable in a first position away from the display panel so as to load the optical plate onto the mounting platform, and in a second position adjacent to the display panel so as to transfer the optical plate from the mounting platform to the display area of the display panel.

The second aspect of the present invention is an electronic device comprising:

a display panel arranged to display a picture; and an optical plate attached on the display panel, wherein the optical plate is configured to sense a touch entry, and wherein the picture is composed of a plurality of views with parallax between the views and the optical plate is also configured to separate the parallax for binocular viewing.

According to an embodiment of the present invention, the electronic device further comprises an electronic processor configured to receive signals indicative of said touch entry, and to arrange the picture for displaying.

According to an embodiment of the present invention, the optical plate comprises a touch sensing layer configured for said sensing and a parallax separation surface configured for said separating, and the parallax separation surface is located between the touch sensing layer and the display panel, the touch sensing layer comprising a graphene layer or an indium tin-oxide layer.

According to an embodiment of the present invention, the parallax separation surface comprises a plurality of lenticules or a plurality of parallax separation units for said separating.

According to an embodiment of the present invention, the display panel comprises a liquid-crystal display panel or a light-emitting panel.

The third aspect of the present invention is an optical plate for use in an electronic device having a display panel, the optical plate comprising:

a parallax separation sheet disposed on the display panel for 3D viewing, and a touch sensing layer provided on the parallax separation sheet.

According to an embodiment of the present invention, the parallax separation sheet comprises a plurality of lenticules or parallax barrier units for parallax separation.

According to an embodiment of the present invention, the parallax separation sheet has a first side to provide the lenticules or the parallax barrier units, and a second side to dispose the touch sensing layer.

According to an embodiment of the present invention, the parallax separation sheet has a first side to provide the lenticules or the parallax barrier unit, and a second side having a flat surface, wherein the touch sensing layer is disposed on the lenticules or the parallax barrier units.

The present invention will become clear upon viewing the drawing figures in conjunction with the description thereof.

BRIEF DESCRIPTION OF THE DRAWINGS

FIG. 13a illustrates the situation when the alignment of the integrated display panel is proper.

FIG. 13b illustrates the situation when the optical plate is misaligned by one half of the lenticular width.

FIG. 13c illustrates the situation when the optical plate is misaligned by being located to the right of the display panel by a quarter of the lenticular width.

FIG. 13e illustrates the situation when the lenticules on the optical plate are not parallel to the image strips of the composite image.

FIG. 13f illustrates the situation when the images strips of the composite image are designed not to be parallel to the pixel rows of the display panel.

FIG. 14 shows an example of a composite image for alignment purposes.

FIG. 18 shows a situation when the optical plate is misaligned with the display panel.

FIG. 19b is the top view of the fixture for holding the assembled display panel in the optical setup of FIG. 19a.

FIGS. 20a to 20e show how the optical setup of FIG. 19a is operated.

DETAILED DESCRIPTION OF THE INVENTION

In order to view a 3D image, a parallax separation sheet, such as a lenticular sheet or a parallax barrier, can be put over a composite image composed of two or more views. A parallax barrier has a plurality of opaque barriers for parallax separation. A lenticular sheet has a plurality of lenticules for parallax separation. The composite image can be displayed on a display panel and a parallax separation sheet can be placed over the display panel for 3D viewing. In embodiments disclosed in this invention disclosure, only a lenticular sheet with lenticules is used to explain the principle of the present invention. However, a parallax barrier can be used. For 3D viewing, a composite image must have a plurality of parallel image strips each of which is covered by one lenticule. Each of the image strips must have a least a pair of left view and right view image components to be viewed by the left eye and the right eye of a viewer. The image components in each image strip can be composed of a row of pixels or more rows of pixels. It is utmost important to align the parallax sheet with the composite image displayed on the display panel. For example, if a lenticular sheet is used for 3D viewing, the lenticules on the lenticular sheet must be properly aligned with the pixel rows on the display panel that compose the image components in the image strips. In a display panel that has a rectangular display area with a shorter dimension and a longer dimension, the pixel rows can be parallel to the shorter dimension or parallel to the longer dimension. Furthermore, the sub-pixels in each pixel can be arranged in a horizontal array or in a vertical array relative to the pixel rows.

When the display panel already has a touch screen disposed thereon, adding a parallax sheet may destroy the touch sensing function or reduce the touch sensitivity. Besides, it is usually very difficult to attach a parallax separation sheet itself on the touch screen of the display panel because the parallax sheet is usually very thin and most likely very soft and flexible. Furthermore, the width of lenticules is usually very small rendering it difficult to align the lenticules to the underlying composite image properly.

The present invention provides a method for aligning a parallax separation sheet with a display panel so as to provide an electronic device for 3D viewing. In embodiments of the present invention, the electronic device is also capable of touch sensing.

Figure 1:
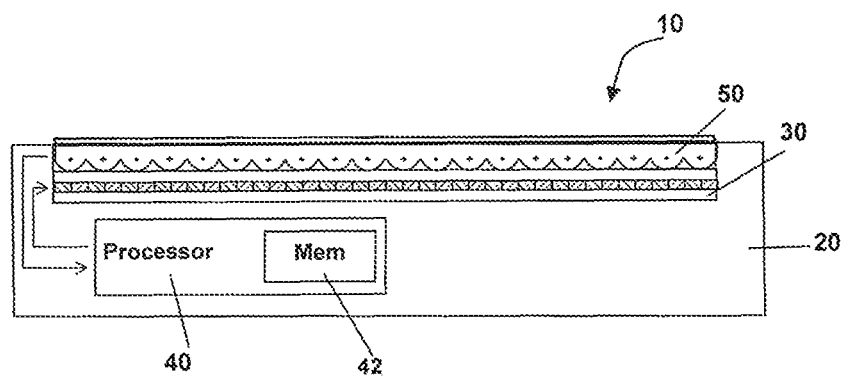
FIG. 1 shows an electronic device having an integrated display panel, according to an embodiment of the present invention.
Figure 2:
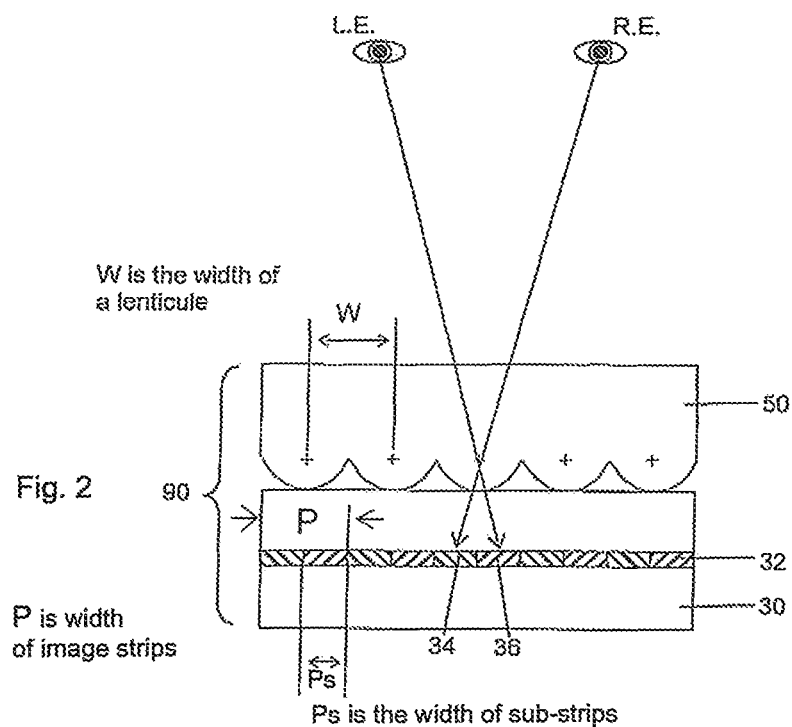
FIG. 2 shows an integrated display panel, according to an embodiment of the present invention.

As shown in FIG. 1, the electronic device 10 has a device housing 20 to accommodate a display panel 30 and an optical plate 50 with a touch layer for touch sensing purposes. According to an embodiment of the present invention, the electronic device 10 also has an electronic processor 40 for various signal and data processing purposes. For example, the processor 40 can be configured to receive an electronic signal indicative of a touch event on the touch layer and convey data from the memory 42 to the display panel for displaying data or information according to the touch event. This type of information or data processing is not part of the invention. The processor 40 can also be configured to compose a composite image from two or more pictures or images of different views to be displayed on the display panel 30. The memory 42 can be used to store the data indicative of the images of different views, the data indicative of the composite image, the software program for composing the composite image, etc. As shown in FIGS. 2-5, the optical plate 50 has a touch sensing layer 70 to allow a user to select stored items or to enter information, for example. The optical plate 50 also a parallax separation surface 60 for 3D viewing purposes. In embodiments of the present invention, the parallax separation surface 60 is located adjacent to the display panel 30. As shown in FIG. 2, the display panel 30 has a pixel layer which can be used to display a composite image 32. The composite image 32 has a row of image strips, each strip has two or more sub-strips representing parts of images or pictures of different views. A sub-strip can cover one or more pixel rows. For illustration purposes, the composite image 32 has a plurality of sub-strips 34, 36 alternately arranged. Each sub-strip 34 or 36 covers one or more pixel rows. The sub-strips 34 will be seen by a viewer's right eye and the sub-strips 36 will be seen by the viewer's left eye. As such, the viewer can see a stereoscopic or 3D image. As shown in FIG. 2, the parallax separation surface 60 has a row of parallax separation units with a width W, and each of the image strips of the composite image 32 has a pair of sub-image strips 34, 36. The width of the image strips is referred to as a pitch P and the width of the sub-image strips is referred to as a sub-pitch Ps. The pitch P is equal to or slightly larger than the width W of the parallax separation units. The pitch P is also referred to as a strip width and the width W of the parallax separation units is also referred to as a unit width which is substantially equal to or slightly smaller than the strip width.

In an embodiment of the present invention, the optical plate 50 is fixedly attached to the display panel 30 so as to form an integrated display panel 90. The integrated display panel 90 can be installed in an electronic device, such as a tablet, a smart phone, a netbook, a notebook, or a digital picture frame, for example. As such, the electronic device can be used to display a 3D image or a series of 3D video images. Since the optical plate 50 has a touching sensing layer 70 as shown in FIGS. 3-5, the electronic device also has touch sensing capability.

Figure 3A:
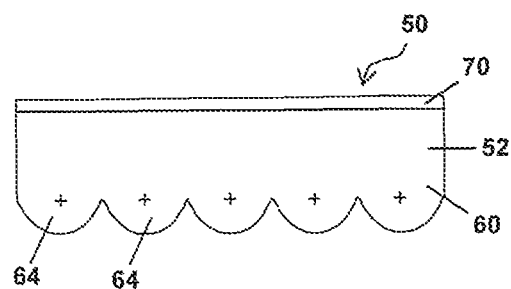
FIG. 3a shows an optical plate to be attached to a display panel to form an integrated display panel, according to one embodiment of the present invention.
Figure 3B:
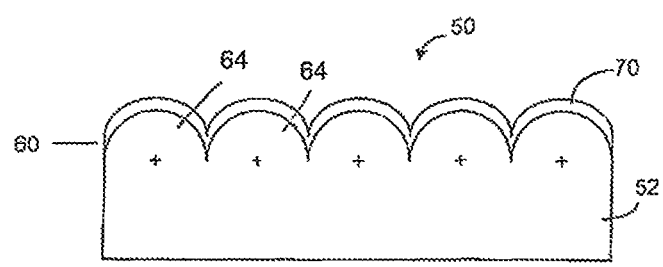
FIG. 3b shown an optical plate to be attached to a display panel with the touching sensing layer is located on the parallax separation surface.

In one embodiment of the present invention, the optical plate 50 comprises a substrate 52 made of a single piece of material, as shown in FIG. 3 One side of the substrate 52 is provided with a parallax separation surface 60 and another side of the substrate 52 is provided with a touch sensing layer 70. In one embodiment, the parallax separation surface 60 has a row of lenticules 64 as the parallax separation units. The lenticules 64 can be directly embossed onto the substrate 52. The touch sensing layer 70 can have one or more touch layers made of graphene or a plurality of touch elements made of indium tin oxide (ITO), for example. The touch sensing layer 70 can have resistive type touch elements or capacitive type touch elements, for example.

In another embodiment, the touch sensing layer 70 is provided on the parallax separation surface 60, substantially conformal to the lenticules 64, as shown in FIG. 3a.

Figure 4:
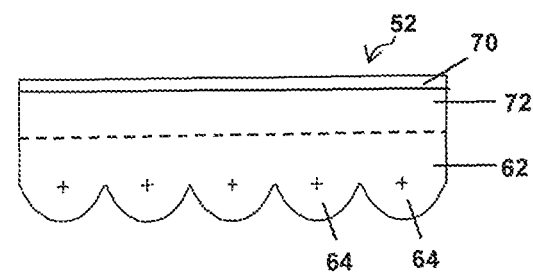
FIG. 4 shows an optical plate to be attached to a display panel, according to another embodiment of the present invention.
Figure 5:
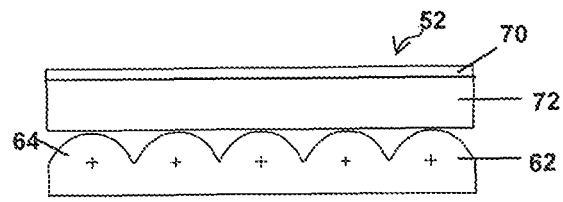
FIG. 5 shows an optical plate to be attached to a display panel, according to yet another embodiment of the present invention.

In one other embodiment, the optical plate 50 comprises a spacer 72 having a touch sensing layer 70, and a parallax separation sheet 62 as shown in FIG. 4. The parallax separation sheet 62 can be a lenticular sheet having a row of lenticules 64. The spacer 72 and the parallax separation sheet 62 can be laminated together with an adhesive or fused together with heat, for example.

In a different embodiment as shown in FIG. 5, the parallax separation sheet 62 is fixedly attached to the spacer 72 with the lenticules 64 facing the spacer 72. It is understood that for effective touch sensing purposes, the touch sensing layer 70 is facing a user.

One aspect of the present invention is to provide an integrated display panel as shown in FIG. 2. The integrated display panel 90 comprises an optical plate 50 fixedly attached to a display panel 30. The display panel 30 can be a LCD panel, a light-emitting panel such as an OLED display panel or any viewing panel that can receive digital image data in order to display an image indicative of the digital image data. The parallax separation surface 60 can be a lenticular sheet 62 having a row of lenticules 64 as shown in FIGS. 4-5, or a parallax barrier sheet. The present invention also provides a method for assembling an integrated display panel. FIGS. 6a-8 illustrate a fixture for assembling an integrated display panel. One of the most important aspect of assembling is to align the parallax separation surface 60 with the composite image 32 formed by the pixels of the display panel 30 (see FIG. 2). It should be noted that the sub-image strips 34, 36 in a composite image 32 are parallel strips. The lenticules 64 on the parallax separation surface 60 (see FIG. 3) are cylindrical lenses having a longitudinal axis (one of the cylindrical lenses can be partly seen on FIG. 8). The alignment is carried out such that the longitudinal axis of the lenticules is substantially parallel to the sub-image strips 34, 36 of the composite image 32. Furthermore, the lenticules must be properly located relative to the sub-image strips 34, 36 such that the sub-image strips 34 will be seen by the right eye and the sub-image strips 36 be seen by the left eye of a viewer as shown in FIG. 2. Let us assume that the sub-image strips 34, 36 are substantially parallel to the Y direction and adjustment of the lenticules relative to the sub-image strips 34, 36 is made along the X direction as shown in FIGS. 6a-8.

Figure 6A:
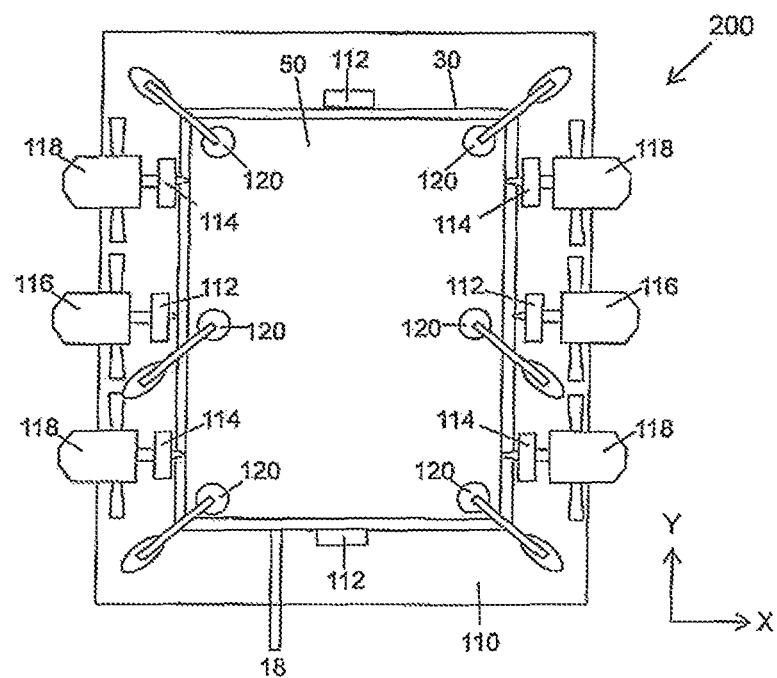
FIG. 6a is a top view of an alignment fixture setup for aligning an optical plate with a display panel, according to an embodiment of the present invention.
Figure 6B:
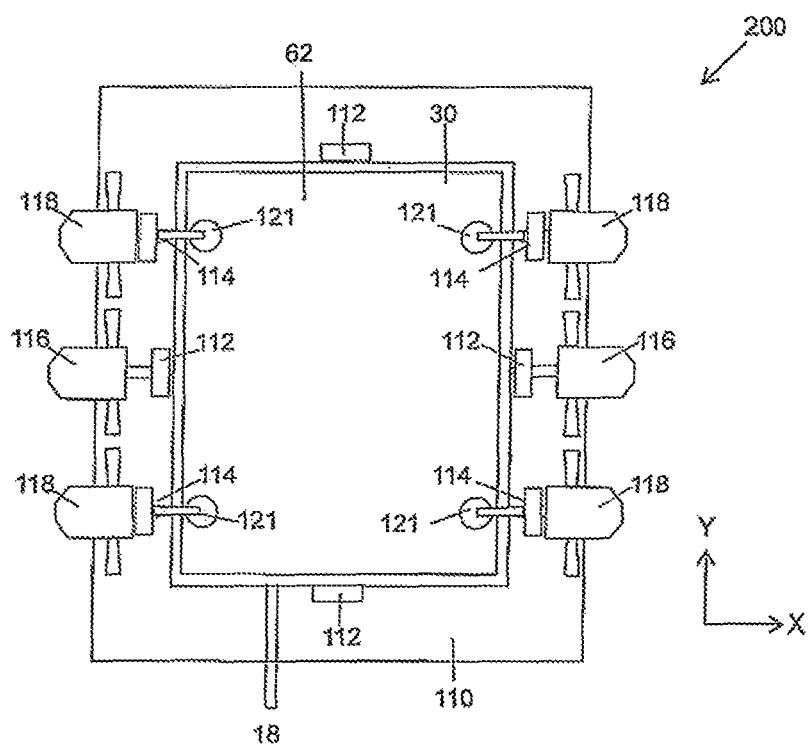
FIG. 6b is a top view of an alignment fixture setup for aligning a lenticular screen with a display panel, according to an embodiment of the present invention.
Figure 7A:
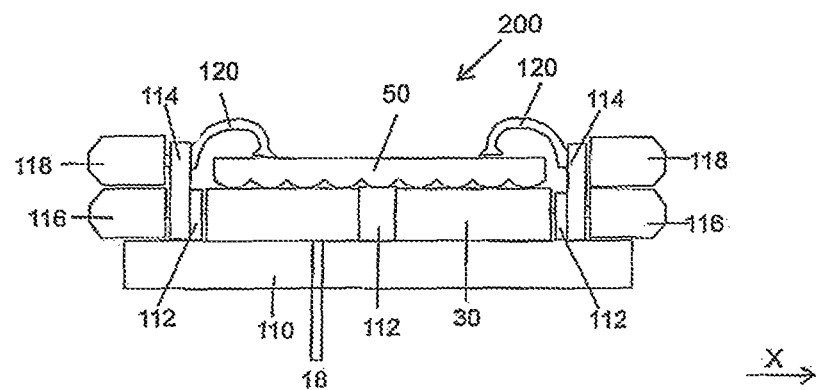
FIG. 7a is a side view of the alignment fixture setup for aligning an optical plate with a display panel.
Figure 7B:
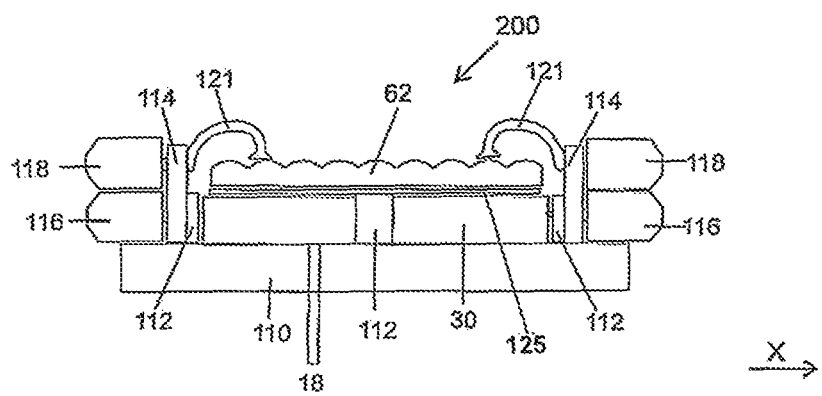
FIG. 7b is a side view of the alignment fixture setup for aligning a lenticular screen with a display panel.
Figure 7C:
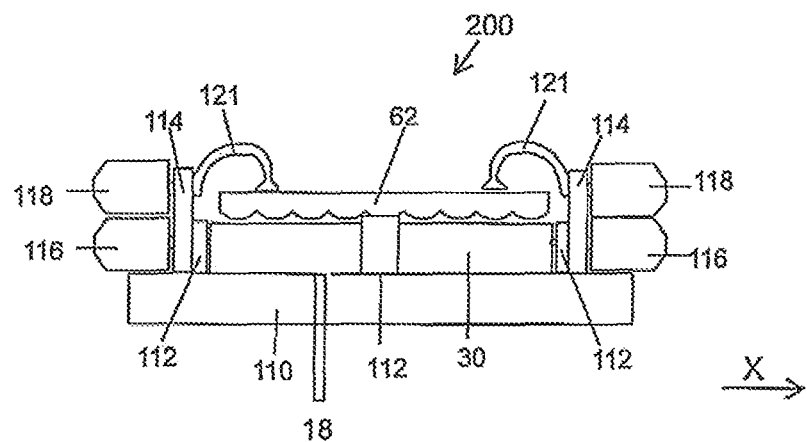
FIG. 7c is a side view of the alignment fixture setup for aligning a lenticular screen with a display panel with the parallax separation surface facing the display panel.
Figure 7D:
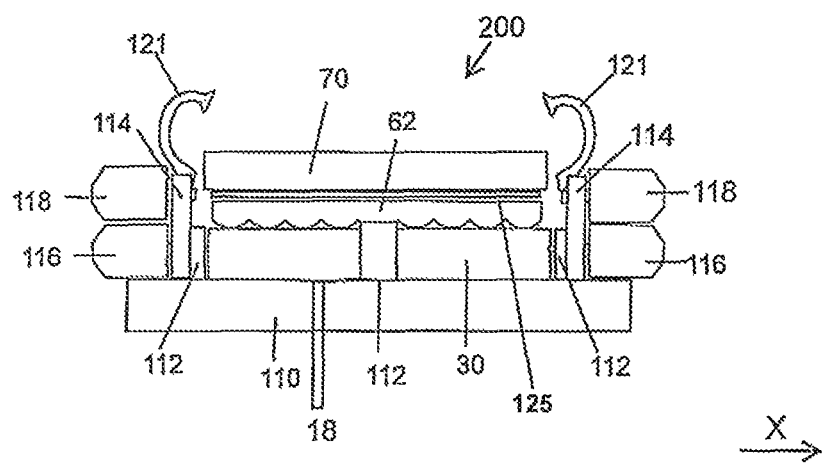
FIG. 7d is a side view of the alignment fixture setup for aligning a lenticular screen with a display panel with the parallax separation surface facing the display panel and a touch sensing layer attached to the lenticular screen.
Figure 8:
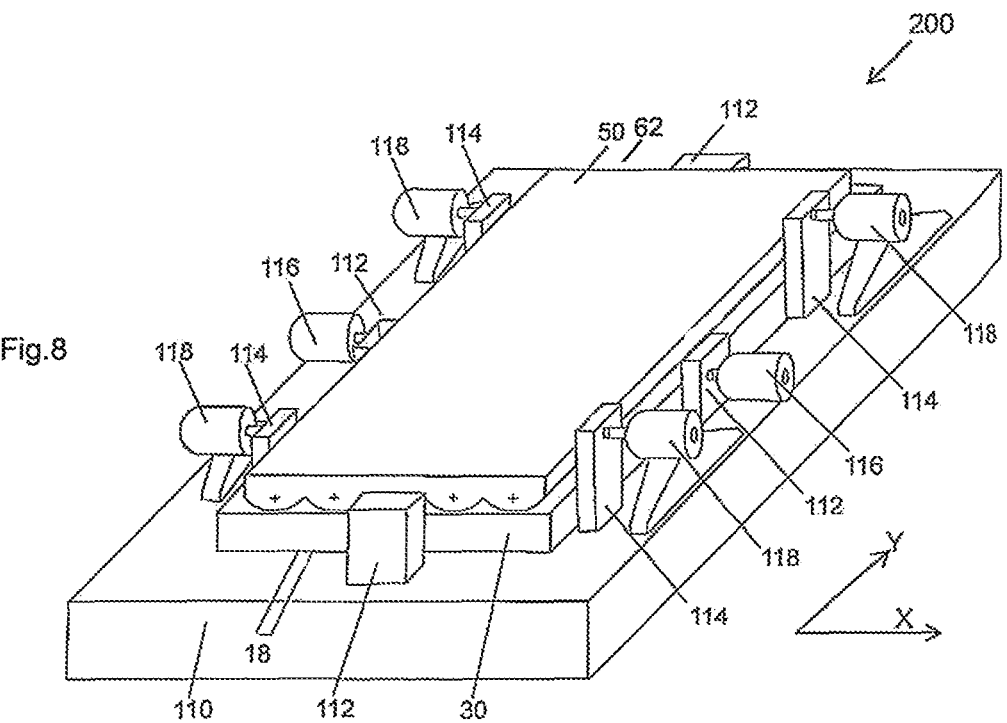
FIG. 8 is an isometric view of the alignment fixture.
Figure 9:
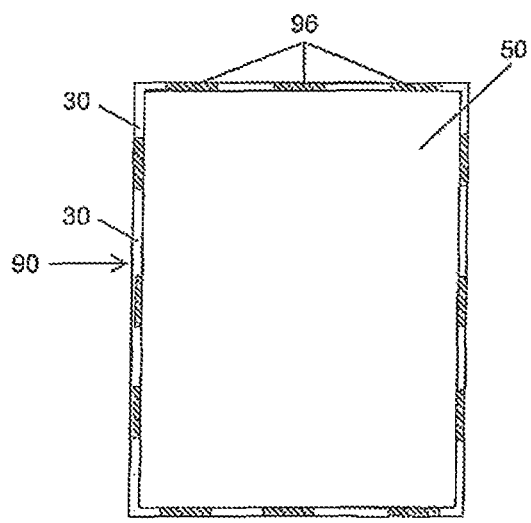
FIG. 9 is a top view of the integrated display panel showing how an optical plate is fixedly attached to a display panel.
Figure 10:
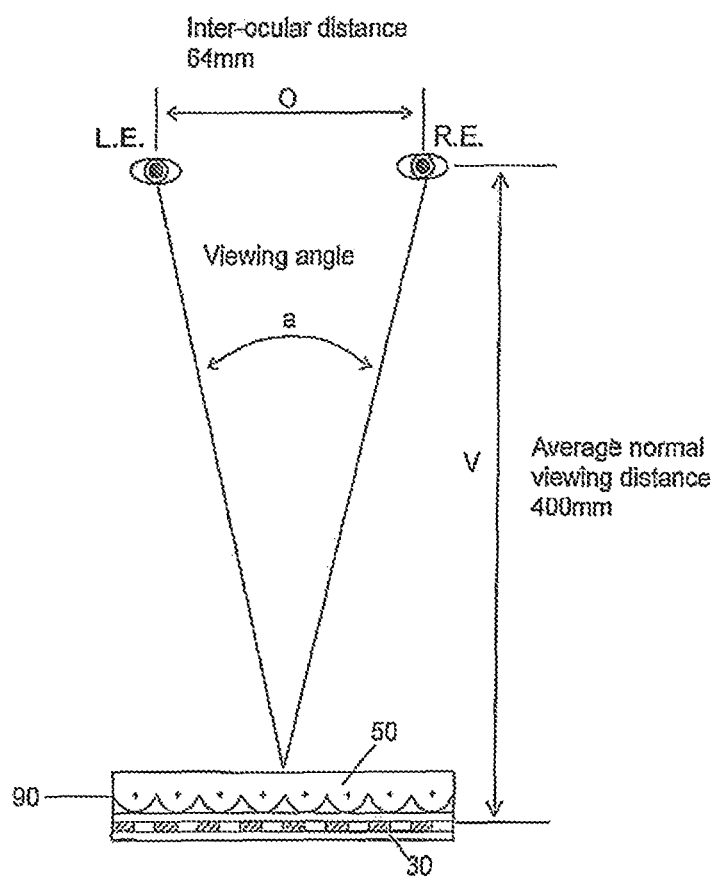
FIG. 10 shows the geometry of 3D viewing in relationship to an integrated display panel of the present invention.
Figure 11:
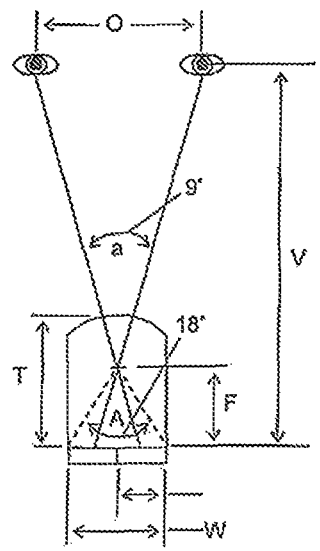
FIG. 11 shows the geometry of 3D viewing in relationship to a single lenticule.
Figure 12:
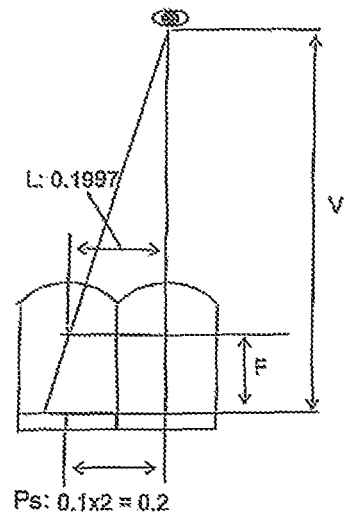
FIG. 12 shows the relationship between the width of a lenticule and an image strip in the composite image.

As shown in FIGS. 6a, 7a and 8, the fixture 200 has a base support 110 for placing a display panel 30. The display panel 30 is held in place by four securing posts 112, one on each side of the display panel 30. Two of the securing posts 112 also have a motor or micrometer 116 to adjust the position of the display panel 30 along the X direction. An optical plate 50 is placed on top of the display panel 30, allowing a gap 30 around the four sides of the optical plate 50 (see FIG. 9). At least two securing posts 114, each with a motor or micrometer 118, are provided on each side of the optical plate 50 for adjusting the position of the optical plate 50 in the X direction. After the alignment is done, a plurality of pressure pads 120 are used to hold the optical plate 50 in place, relative to the display panel 30. A sealer or glue or adhesive 96 is used to fixedly attach the optical plate 50 to the display panel 30 to form an integrated display panel 90 (see FIG. 9). It should be noted that the lenticule or lenticules shown in FIGS. 11 and 12 are equivalent to one segment of the optical plate 50 (see FIG. 10). It should be noted that the fixture for the alignment of the optical plate 50 as shown in FIGS. 6a and 7a can also be used for the alignment of the lenticular screen 62 as shown in FIGS. 6b and 7b. As shown in FIG. 7b, an adhesive or a double-sided tape can be used to attach the lenticular sheet 62 to the display panel 30. Furthermore, the pressure pads 120 or mechanical figure can be placed at different locations for applying pressure onto the optical plate 50 or the lenticular screen 62 as shown in FIGS. 6b, 7b, 7c and 7d. In the embodiment as shown in FIG. 7c, as the lenticule side of the lenticular screen 62 is facing the display panel 30, no adhesive or glue is used on the lenticule side of the lenticular screen 62. A sealer or glue or adhesive 96 is used to fixedly attach the lenticular sheet 62 to the display panel 30 to form an integrated display panel (similar to FIG. 9). In the embodiment as shown in FIG. 7d, after or before the lenticular screen 62 is fixedly attached to the display panel 30, a touch sensing layer 70 is fixedly attached to the lenticular screen 62 with an adhesive or a double-sided tape.

In order to align the integrated display panel 90 properly, the viewing setting must first be estimated. That is, the viewing distance and the viewing angle must be determined. As shown in FIG. 10, the average normal viewing distance (V) of a person is 400 mm and the inter-ocular distance (O) is 64 mm. Thus, the viewing angle (a) is about 9 degrees. As shown in FIG. 11, the lenticular angle (A) is twice the viewing angle (a) or about 18 degrees. If the image-strip width or pitch (P) of the composite image is 0.2 mm, the lenticule focal point (F) is 0.64 mm. The thickness (T) of the lenticule can be 1 mm. As shown in FIG. 12, the actual width of the lenticule (W) should be 0.1997, slightly smaller than the pitch (P) of 0.2 mm. In FIGS. 11 and 12, Ps is the width of the sub-image strips which is half of the pitch P as shown in FIG. 2.

Figure 13:
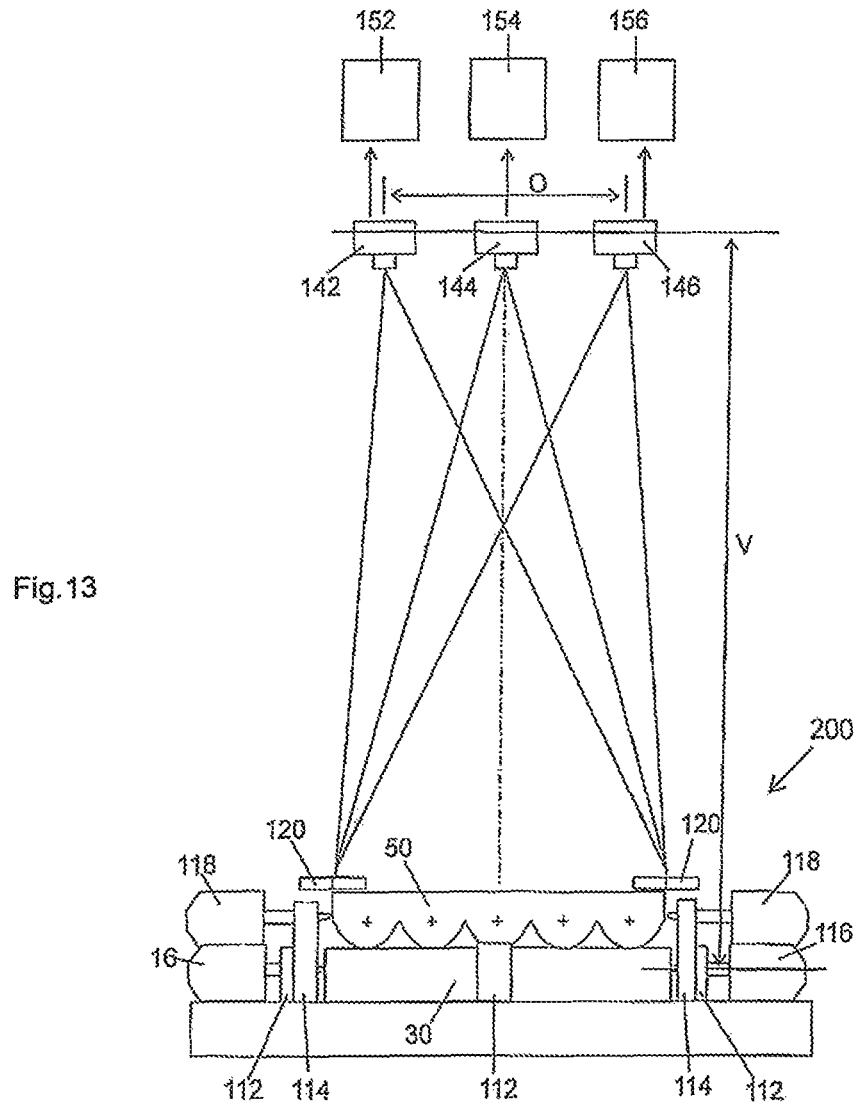
FIG. 13 is a graphical representation of an optical setup for monitoring the alignment of the integrated display panel.

According to an embodiment of the present invention, three cameras 142, 144 and 146 are set up at a distance substantially equal to the average normal viewing distance (V) as shown in FIG. 13. The image captured by camera 142 is used to simulate what the left eye of a viewer would see. The image captured by camera 146 is used to simulate what the right eye of a viewer would see. The middle camera 144 is used to monitor a situation where the misalignment is less than one quarter of the width of a lenticule. The images captured by the cameras 142, 144 and 146 are displayed on monitors 152, 154 and 156, respectively. For alignment purposes, the composite image 32 can be designed as a pattern of a two-dimensional array of blocks as shown in FIG. 14.

Figure 13D:
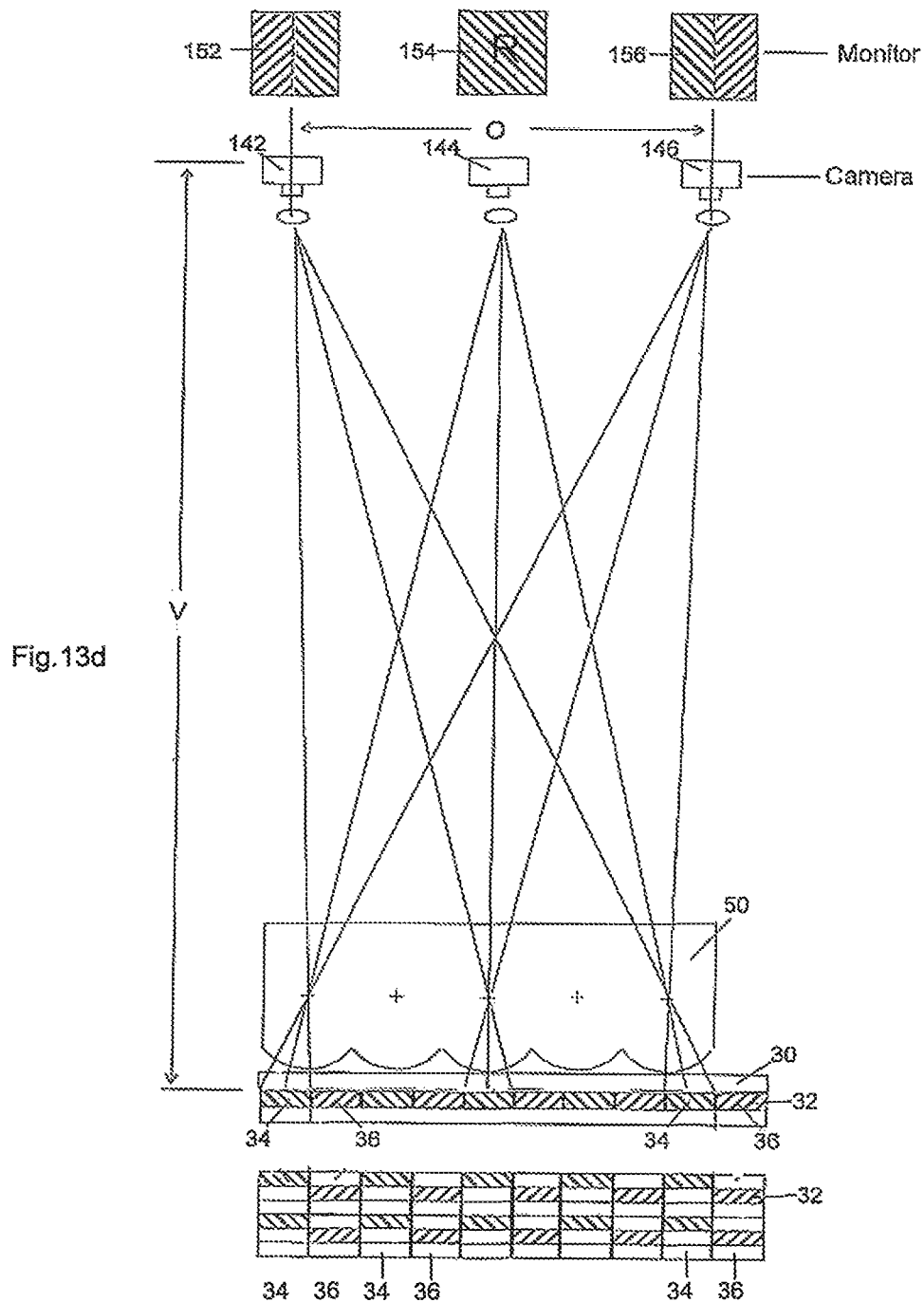
FIG. 13d illustrates the situation when the optical plate is misaligned by being located to the left of the display panel by a quarter of the lenticular width.

In the composite image 32, the sub-image strips 34 (the right view) are intended to be seen by camera 146 and the sub-image strips 36 (the left view) are intended to be seen by camera 142 if the alignment between the optical plate 50 (or the lenticular screen 62) and the display panel 30 is proper. In general, each of the lenticules 64 (see FIGS. 3-5) is designed to separate the left view from the right view and vice versa. Thus, when the alignment between the optical plate 50 and the display panel 30 is proper, the camera 142 can only see sub-image strips 36 in the composite image 32; the camera 146 can only see sub-image strips 34 in the composite image 32; and the camera 144 can see about half of each of the strips 34 and half of each of the strips 36 in the composite image 32 as shown in FIG. 13a. Thus, what the monitors 152 and 156 show are patterns shown in image sub-image strips 36 and 34, respectively, and what the monitor 154 show is the combination of strips 36 and strips 34. FIG. 13b shows when the optical plate 50 is misaligned by half the width of the lenticules. As such, the camera 142 sees sub-image strips 34 and the camera 146 sees the sub-image strips 36, and the camera 144 sees about half of each of the strips 34 and half of each of the strips 36 in the composite image 32. FIG. 13c shows when the optical plate 50 is misaligned by being located to the right of the display panel 30 by a quarter of the lenticular width. As such, the camera 144 can only see sub-image strips 36 of the composite image 32. Each of the cameras 142 and 146 sees different halves of strips 34 and 36 of the composite image 32. Thus, monitor 154 shows a pattern of the left view (L). FIG. 13d shows when the optical plate 50 is misaligned by being located to the left of the display panel 30 by a quarter of the lenticular width. As such, the camera 144 can only see sub-image strips 34 of the composite image 32. Each of the cameras 142 and 146 sees different halves of strips 34 and 36 of the composite image 32. Thus, monitor 144 shows a pattern of the right view (R). FIG. 13e shows when the longitudinal axis of the lenticules is not parallel to the strips 34, 36 of the composite image 32. As such, none of the monitors shows the pattern of a left view or the pattern of a right view. It should be understood that the patterns shown on the monitors are for illustration purposes only. The patterns may not be proportionally correct and can vary depending on the geometry of the lenticules. According to an embodiment of present invention, the strips 34 comprise a first color and the strips 36 comprises a different second color.

FIG. 13f shows a situation when the image strips on the composite image are not parallel to the pixel rows. In such as case, the optical plate 50 should be aligned with the display panel according to the strip orientation, not the pixel rows. In FIG. 13f, seven cameras are used to capture the image of an object for providing seven views in the composite image. For example, each of the sub-image strips cover only one shifted pixel row. In this illustration, the shifted angle is such that any sub-image strip is shifted by one sub-pixel from one pixel row to another pixel row.

In the above set up, the composite image 32 is provided by image data or signal input via an electronic connector 18 (see FIG. 6a, for example). It should be noted that the patterns shown on the monitors 152, 154 and 156 are for illustrative purposes only. Different design of the composite image 32 will result in different patterns on the monitors.

It should be noted that the optical setup (with cameras 141, 144, 146 and monitors 152, 154, 156) for monitoring the alignment of an optical plate 50 with a display panel 30 as shown in FIGS. 13 and 13a-13f can also be used to monitor the alignment of a lenticular screen 62 with a display panel 30. For the alignment of a lenticular screen 62 with a display panel 30, the fixture 200 can also be used as shown in FIGS. 7b, for example. Furthermore, the pressure pads 120 and 121 can be used on the fixtures 200 as shown in FIGS. 6a, 6b, and 7a-7d.

Figure 15:
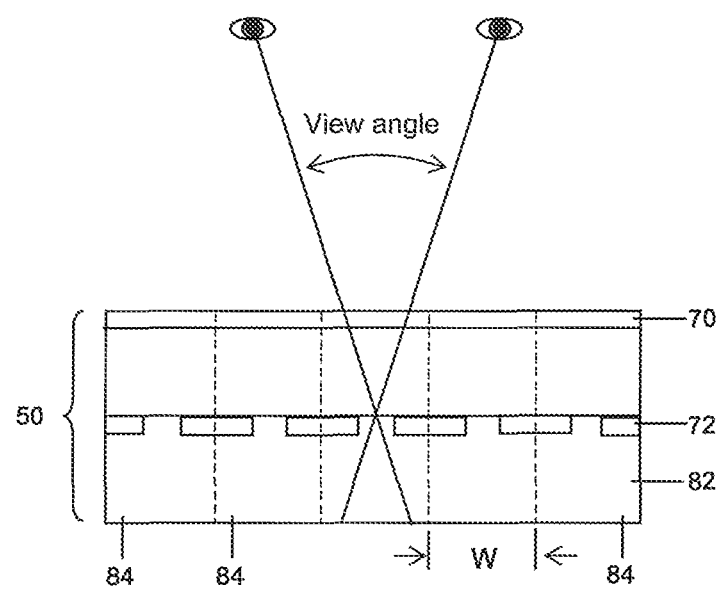
FIG. 15 shows an optical plate to be attached to a display panel according to another embodiment of the present invention, wherein the optical plate has a parallax barrier for parallax separation.

It should also be noted that in the electronic device as illustrated in FIGS. 1 and 2; the optical plate 50 as illustrated in FIGS. 2 to 5, 10 and 11; and the alignment apparatus as illustrated in FIGS. 6a to 9, 13, 13a-13f; a lenticular screen 62 having a plurality of lenticules 64 is used as a parallax separation sheet. In other embodiments of the present invention, the lenticular screen 62 is replaced by a parallax barrier 82 having a plurality of parallax barrier units 84 as shown in FIG. 15. As shown in FIG. 15, the parallax barrier units 84 are formed from opaque and clear segments alternately arranged to separate the left-eye view from the right-eye view.

It should be noted that FIGS. 13 to 13e illustrate a process for assembling an optical plate 50 onto a display panel 30 to form an integrated display panel 90. When the optical plate 50 and the display panel 30 are correctly assembled, the left eye of a viewer will see a left view and the right eye will see a right view as shown in FIG. 2. The left view is composed of sub-strips 36 and the right view is composed of sub-strips 34. In order to ensure that an integrated display panel 90 is correctly assembled, a fixture as shown in FIG. 16 can be used.

Figure 16:
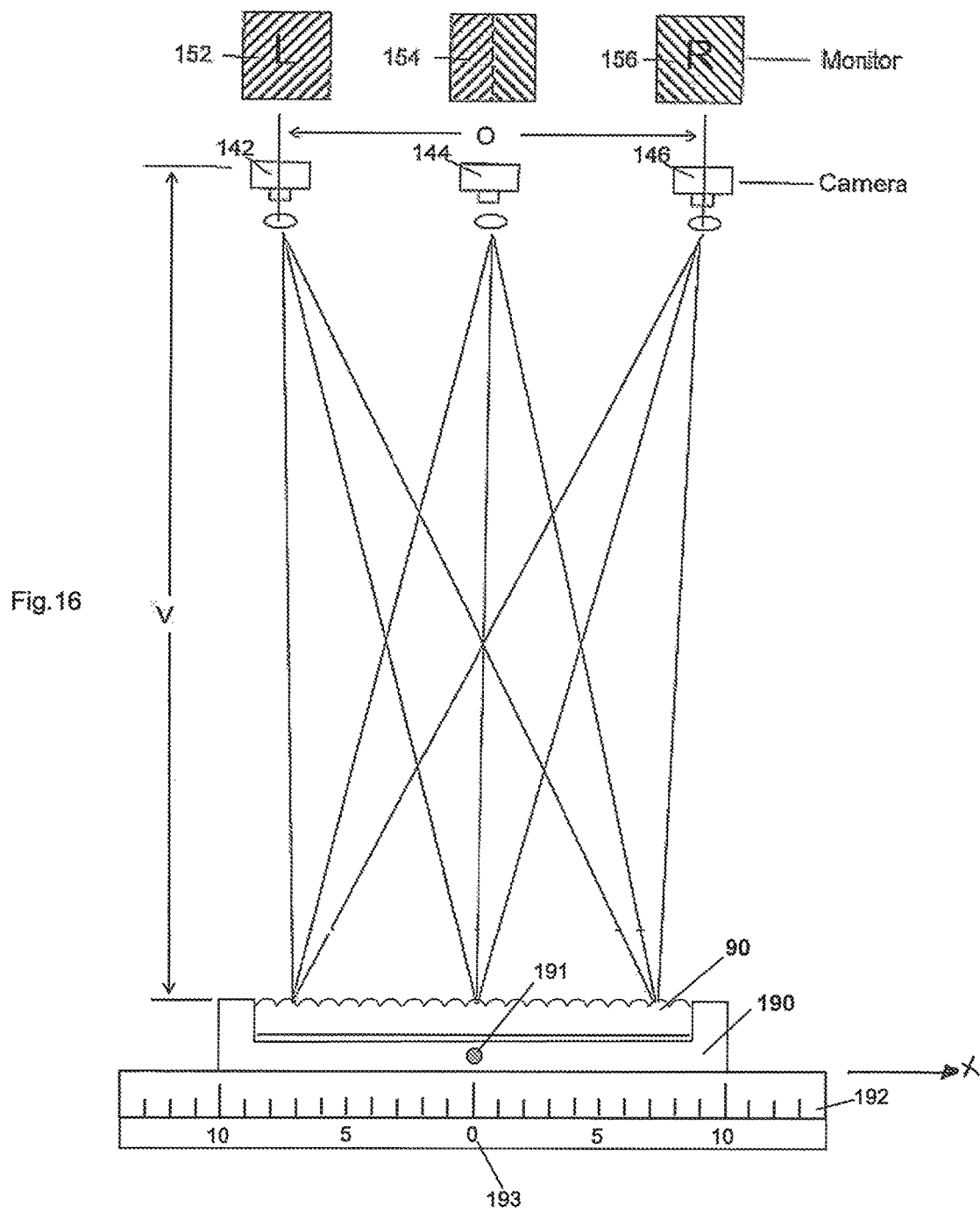
FIG. 16 shows a fixture for checking an assembled display panel having an optical plate disposed on top of the display panel, indicating that the alignment between the optical plate and the display panel is correct.

As shown in FIG. 16, the fixture includes a panel holder 190 for holding an assembled (integrated) display panel 90. The panel holder 190 is configured for shifting along the X direction relative to a sliding scale 192. The panel holder 190 has a center mark 191, which can be located at the center position 193 of the sliding scale 192. As with the setup shown in FIG. 13a, three cameras 142, 144 and 146 and three monitors 152, 154 and 156 are used to check the alignment in the assembled display panel 90. If the alignment (between the optical plate 50 and the display panel 30 as shown in FIG. 2) in the assembled display panel 90 is correct, the patterns shown on the monitors 152, 154 and 156 are similar to those shown in FIG. 13a.

Figure 16A:
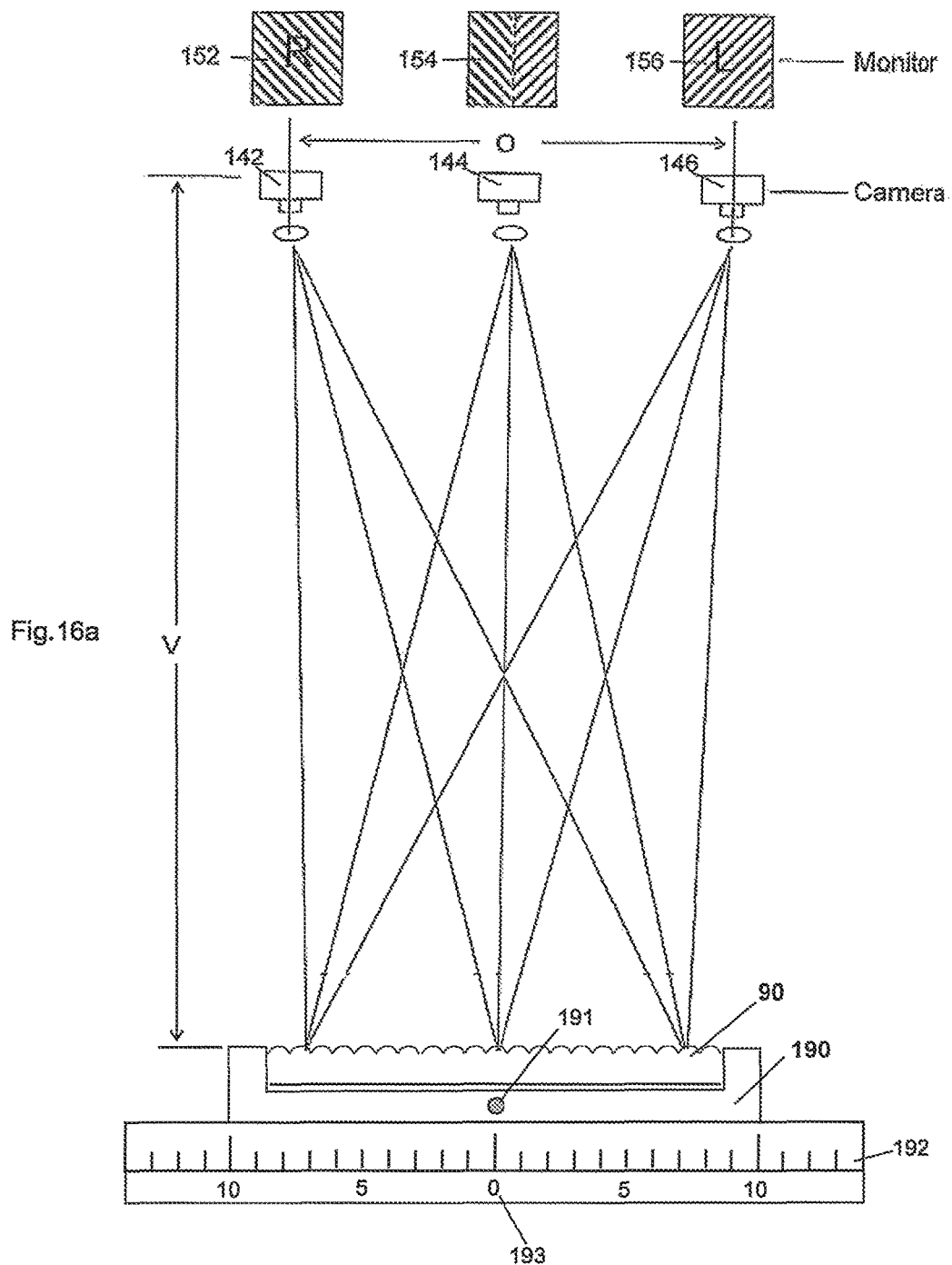
FIG. 16a shows the fixture of FIG. 16 when the alignment between the optical plate and the display panel is incorrect.
Figure 17:
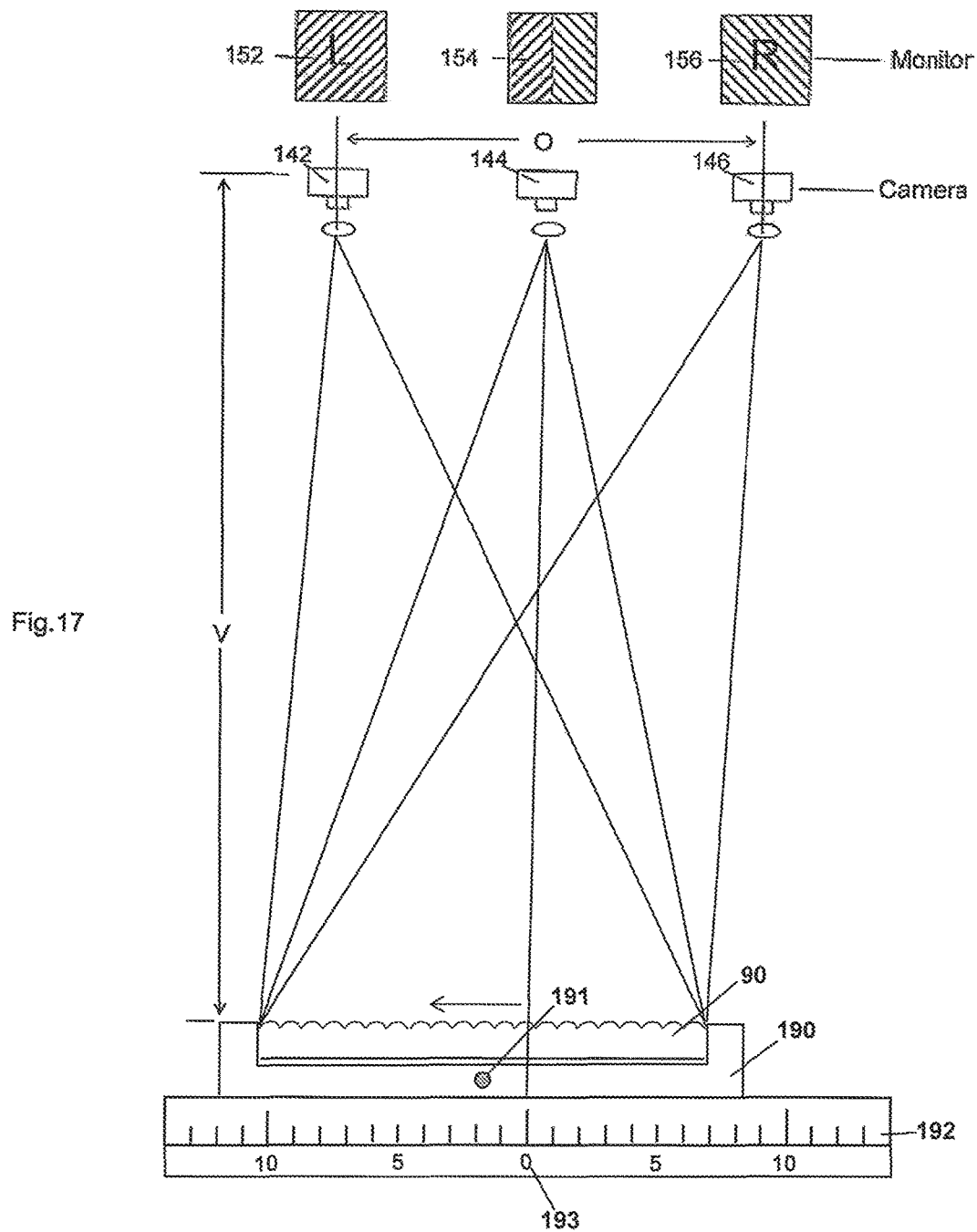
FIG. 17 shows the fixture of FIG. 16a with the assembled display panel being shifted relative to a slide scale.

If the patterns on the monitors 152, 154 and 156 are similar to those as shown in FIG. 16a, then the alignment in the assembled display 90 is incorrect, resulting in a pseudoscopic 3D picture (see FIG. 13b). In order to determine how far off the incorrect alignment from the correct alignment, it is possible to shift the holder 190 relative to the sliding scale 192 until the patterns on the monitors 152, 154 and 156 are similar to those shown in FIG. 13a. By comparing the location of the center mark 190 with the center position 193 on the sliding scale 192 as shown in FIG. 17, the shifting distance can be determined. In a situation as shown in FIG. 18, the off-alignment is only by a quarter of an image strip (or half of the width of a sub-strip, see FIG. 2), and each of the sub-strips 34 for the right view is located at the center of the lenticule in the optical plate 50 (see FIG. 3a, for example). This alignment better suits a person with a dominant right eye.

Figure 19A:
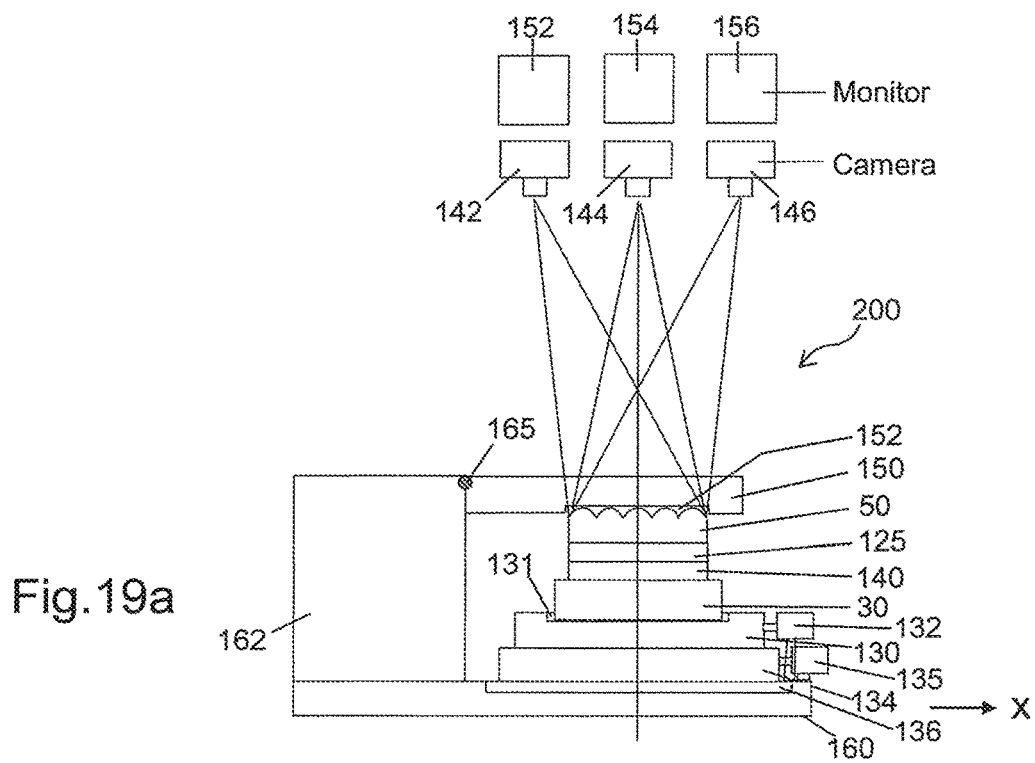
FIG. 19a shows a side view of an optical setup for monitoring the alignment of an integrated display panel, according to another embodiment of the present invention.

FIG. 19a shows a side view of an optical setup for monitoring the alignment of an integrated display panel in the assembling process, according to another embodiment of the present invention. As shown in FIG. 19a, the fixture 200 has a base plate 160, a shifting plate 134 disposed on the base plate 160, and a rotating plate 130 disposed on the shifting plate 134. The rotating plate 130 has a recess portion 131 configured to hold a display panel 30. The fixture 200 also has a mounting platform 150 with a recess portion 152 configured to hold an optical plate 50. The mounting platform 150 is pivotably mounted on a stand 162 by a hinge 165. The stand 162 is fixedly attached to the base plate 160. As with the fixture 200 as shown in FIG. 13, three cameras 142, 144 and 146 along with three monitors 152, 154 and 156 are used to monitor the alignment between the optical plate 50 and the display panel 30. As seen in FIG. 19a, an adhesive layer 125 is fixedly attached to the optical plate 50 and a release liner 140 is provided between the adhesive liner 125 and the display panel 30. The rotating plate 130 has a micrometer or motor 132 for adjusting the rotating plate 130. The base plate 160 has a pair of linear tracks 136 to guide the shifting plate 134 which can be linearly adjusted by a micrometer or motor 135, for example.

Figure 19B:
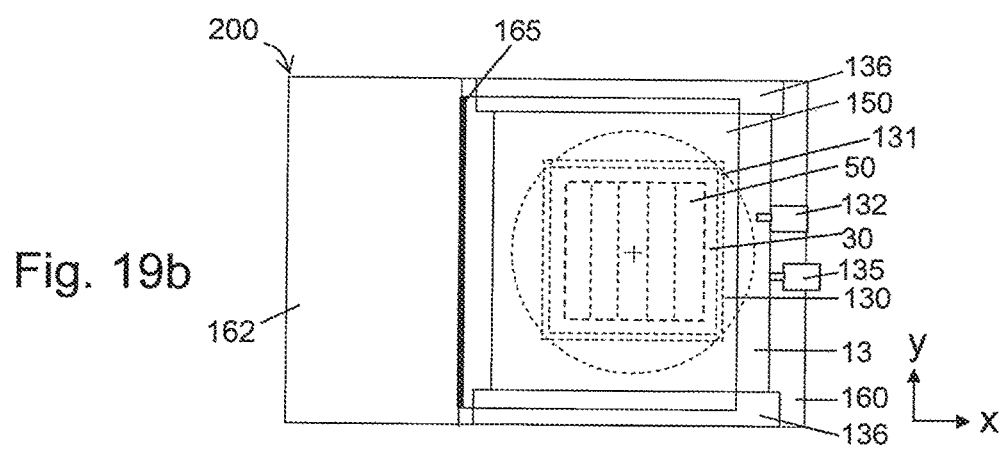

FIG. 19b is the top view of the fixture 200, showing the hinge 165 as being parallel to the Y axis.

Figure 19C:
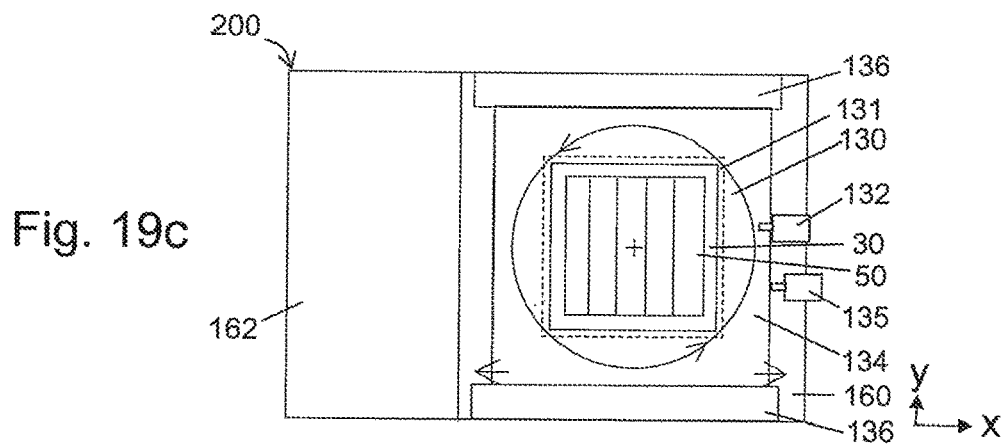
FIG. 19c is the top view of the fixture showing various movement devices.

FIG. 19c is the top view of the fixture 200 showing the shifting plate 134 which can be shifted along the X direction together with the rotating plate 130 in a linear motion relative to the base plate 160. The rotating plate 130 can be rotated on the X-Y plane together with the display panel 30, relative to the shifting plate 130.

Figure 20A:
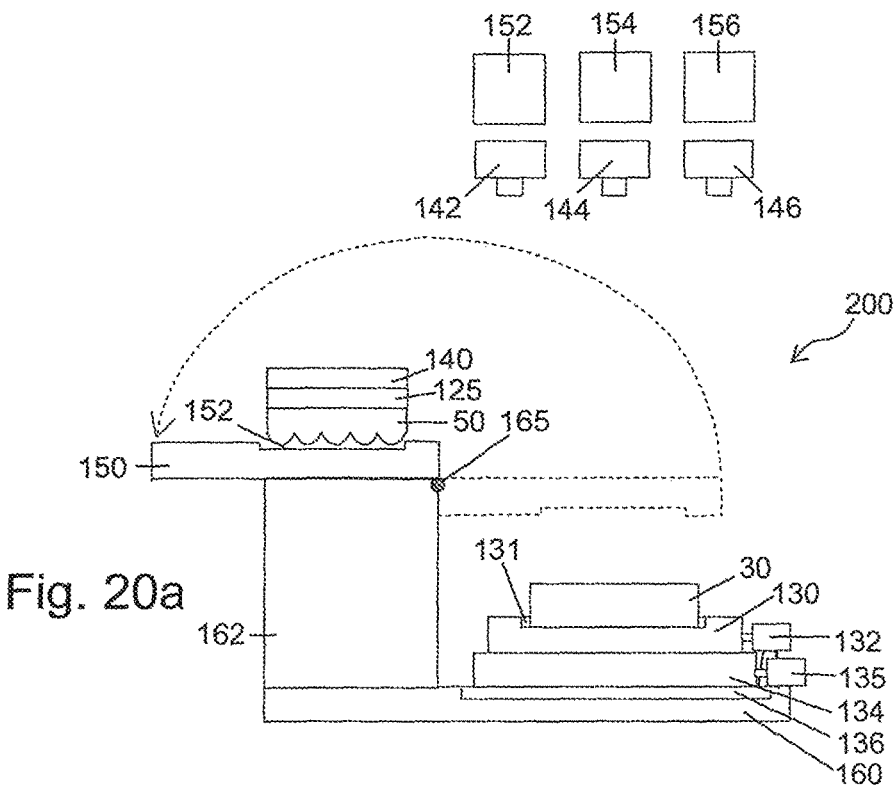

FIGS. 20a to 20e show how the optical setup of FIG. 19a is operated. FIG. 20a shows the fixture 200 when the mounting platform 150 is operated in a first position, allowing an optical plate 50 to be mounted on the mounting platform 150. The mounting platform 150 may have a securing mechanism such as a vacuum suction plate to secure an optical plate 50 or to release the optical plate 50 from the mounting platform 150. In order to assemble an integrated display panel, a display panel 30 is securely mounted on the rotating plate 130 so that the display panel 30 can be rotated together with the rotating plate 130 relative to the shifting plate 134. Separately, an optical plate 50, along with an adhesive layer 125 and a release liner 140, is securely mounted on the mounting platform 150 at a designated location thereon.

Figure 20B:
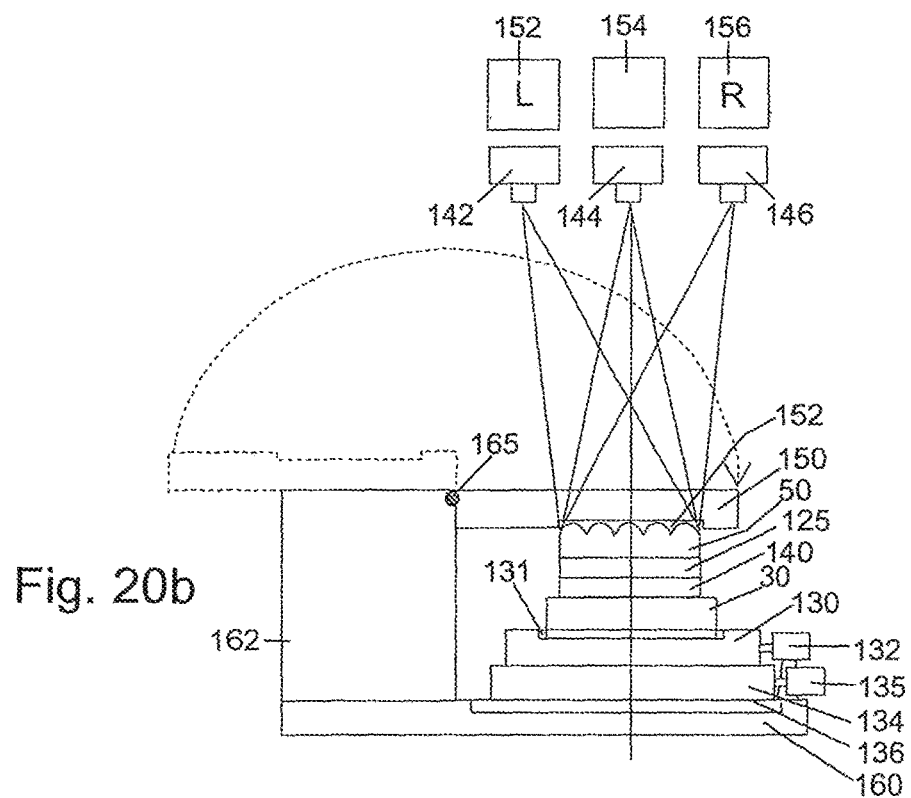

After the optical plate 50 and the display panel 30 are properly secured on the fixture 200, the mounting platform 150 is caused to change from the first position to a second position as shown in FIG. 20b. As such, the optical plate 50, together with the adhesive layer 125 and the release liner 140, is positioned on the display area of the display panel 30. The mounting platform 150 may have a transparent window or an open window to allow the cameras 142, 144 and 146 to check the alignment between the optical plate 50 and the display panel 30.

It is understood that the optical plate 50 has a parallax separation surface 60 with a plurality of parallax separation units 64 (see FIG. 3a, for example). For example, the parallax separation surface 60 can be a lenticular surface with a plurality of lenticules, each of which is a cylindrical lens having a longitudinal axis. The placement of the optical plate 50 is such that the longitudinal axis of the parallax separation units 64 is substantially parallel to the Y axis. Likewise, the image strips on the display panel 30 are also substantially parallel to the Y axis. If the parallax separation units on the optical plate 50 and the image strips on the display panel 30 are not parallel to each other, a Moire pattern can be seen. It is possible to rotate the display panel 30 by turning the rotating plate 130 so that the image strips on the display panel 30 appear to be parallel to the parallax separation units. Furthermore, based on the patterns on the monitors 152, 154 and 156, it is possible to determine whether the alignment between the optical plate 50 and the display panel 30 is correct, such as the situation shown in FIG. 13*a*. If the alignment is incorrect, the display panel 30 can be shifted along the X direction by moving the shifting plate 134.

Figure 20C:
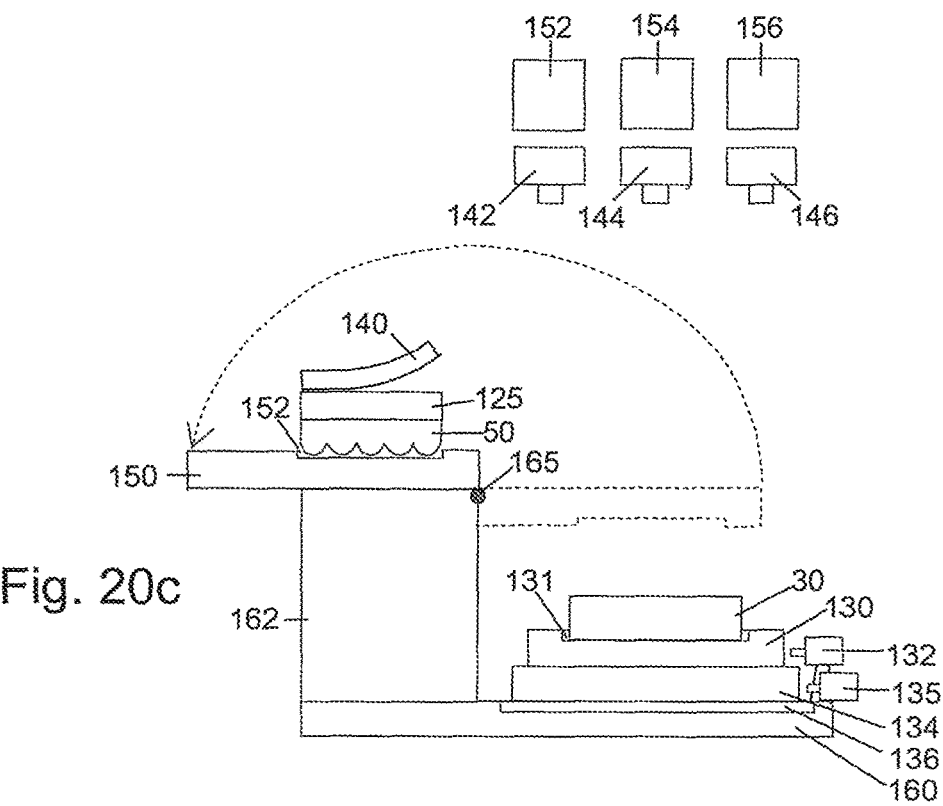

Once the alignment between the display panel 30 and the optical plate 50 is correct, the mounting platform 150 is returned to the first position as shown in FIG. 20*c*. Without disturbing the position of the optical plate 50 on the mounting platform 150, the release liner 140 is peeled off in order to expose the adhesive layer 125.

Figure 20D:
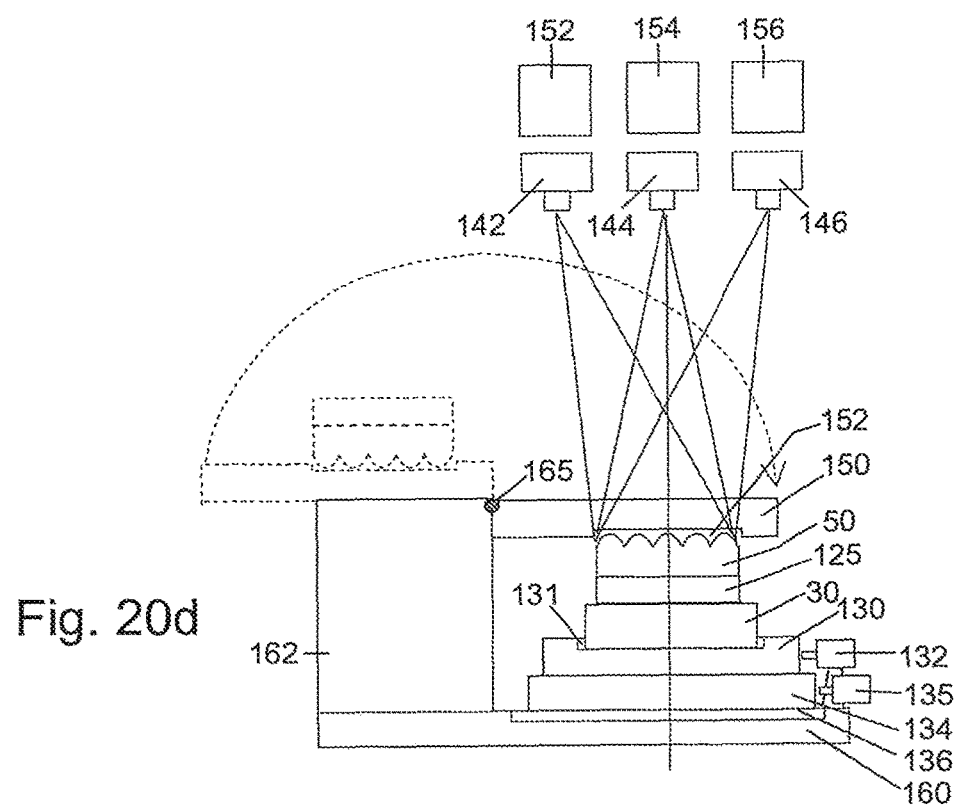

Now the optical plate 50, together with the exposed adhesive layer 125, can be placed on top the display panel 30 to form an integrated display panel as shown in FIG. 20*d*. With the adhesive layer 125 being securely attached to the display panel 30, the optical plate 50 can be released from the mounting platform 150. The mounting platform 150 can be moved back to the first position as shown in FIG. 20*e* so that the integrated display panel, including the display panel 30, the adhesive layer 125 and the optical plate 50, can be removed from the fixture 200.

It should be noted that the rotational movement of the rotating plate 130 is independent from the shifting plate 134 and the rotational movement can be achieved by using a motor or the like. Similarly, the shifting movement of the shifting plate 134 relative to the base plate can be achieved by using another motor or the like, which is known in the art.

In another embodiment of the present invention, the alignment and attachment can be carried out without having the adhesive layer 125 and the release liner 140 provided on the optical plate 50 as shown in FIGS. 20*a*-20*e*. In this embodiment, a bare optical plate 50 is mounted on the mounting platform 150, similar to the mounting as shown in FIG. 20*a*. After the optical plate 50 is directly placed on top of the display panel 30, similar to the placement as shown in FIG. 20*b*, the rotating plate 130 and the shifting plate 134 can be adjusted to complete the alignment process. The bare optical plate 50 is then removed from the display panel 30 similar to removal as shown in FIG. 20*c*. Now a liquid adhesive can be provided on the display panel 30, and the optical plate 50 is once again placed on top of the display panel 30 for fix attachment with the display panel 30 together with the liquid adhesive, similar to the attachment as shown in FIG. 20*d*. Once the liquid adhesive is settled, the mounting platform 150 can be moved away, similar to the situation as shown in FIG. 20*e*. It should be noted that rotating plate 130 can be a vacuum holder to hold the display panel 30, for example.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method for aligning an optical plate and a display panel, wherein the display panel has a display area arranged to display a picture, the picture is composed of a plurality of image strips having a strip width, the image strips arranged in parallel to each other in a first axis, each image strip having at least two sub-strips indicative of a plurality of views, and wherein the optical plate comprises a parallax separation surface having a plurality of parallax separation units, each parallax separation unit having a longitudinal axis and a unit area, the unit area having an area width substantially equal to or slightly smaller than the strip width, said method comprising:
providing a base support;
securing the display panel on the base support;
placing the optical plate on the display area of the display panel; and
adjusting the display panel so that the optical plate aligns with the image strips of the display area, wherein said adjusting comprises:
rotating the display panel relative to the optical plate, if necessary, so that the longitudinal axis of the parallax separation unit is substantially parallel to the first axis; and
shifting the display panel relative to the optical plate, if necessary, so that the unit area of the parallax separation unit substantially covers the strip width of an image strip, said method further comprising:
providing a plurality of first securing posts on the base support for said securing and said adjusting;
arranging a plurality of second securing posts for holding the optical plate; and
arranging a plurality of adjustment devices provided on the second securing posts for adjusting the optical plate.

2. The method according to claim 1, wherein the base support comprises a rotating plate arranged for said rotating and a shifting plate arranged for said shifting.

3. The method according to claim 1, wherein the parallax separation surface comprises a lenticular sheet or a parallax barrier to provide the plurality of parallax separation units.

4. The method according to claim 1, wherein the optical plate has a first surface and a second surface, the first surface facing the display area, the optical plate further comprising a touch sensing layer on the second surface.

5. The method according to claim 1, further comprising:
providing a mounting platform operable in a first position away from the display panel so as to load the optical plate onto the mounting platform, and in a second position adjacent to the display panel so as to transfer the optical plate from the mounting platform to the display area of the display panel.

6. A method for aligning an optical plate and a display panel, wherein the display panel has a display area arranged to display a picture, the picture is composed of a plurality of image strips having a strip width, the image strips arranged in parallel to each other in a first axis, each image strip having at least two sub-strips indicative of a plurality of views, and wherein the optical plate comprises a parallax separation surface having a plurality of parallax separation units, each parallax separation unit having a longitudinal axis and a unit area, the unit area having an area width substantially equal to or slightly smaller than the strip width, said method comprising:
providing a base support;
securing the display panel on the base support;

placing the optical plate on the display area of the display panel;

adjusting the display panel so that the optical plate aligns with the image strips of the display area; and locating a plurality of cameras positioned at a distance from the optical plate, at least two of the cameras arranged for capturing at least two of the plurality of views at two viewing angles, and wherein the picture displayed on the display panel comprises a composite image of a test pattern, such that when the parallax separation sheet is substantially aligned with the composite image, the views captured by said at least two of the cameras provide two distinguishable component patterns; and arranging a plurality of viewing devices, including two monitors for showing the views captured by said at least two of the cameras.

7. The method according to claim 6, wherein each of the two distinguishable component patterns has a different color.

8. The method according to claim 6, wherein the plurality of cameras further comprises a third camera positioned between said at least two of the cameras for capturing a different view of the composite image and viewing devices further comprise a third monitor for showing the view captured by the third camera.

9. An electronic device comprising:

a display panel arranged to display a picture; and an optical plate attached on the display panel, wherein the optical plate is configured to sense a touch entry, and wherein the picture is composed of a plurality of views with parallax between the views and the optical plate is also configured to separate the parallax for binocular viewing, wherein the optical plate comprises a touch sensing layer configured for said sensing and a parallax separation surface configured for said separating, and the parallax separation surface is located between the touch sensing layer and the display panel.

10. The electronic device according to claim 9, further comprising an electronic processor configured to receive signals indicative of said touch entry, and to arrange the picture for displaying.

11. The electronic device according to claim 9, wherein the touch sensing layer comprising a graphene layer or an indium tin-oxide layer.

12. The electronic device according to claim 11, wherein the parallax separation surface comprises a plurality of lenticules or a plurality of parallax separation units for said separating.

13. The electronic device according to claim 9, wherein the display panel comprises a liquid-crystal display panel or a light-emitting panel.

14. The electronic device according to claim 9, wherein the parallax separating sheet comprises a first side and an opposing second side, the second side having a lenticular surface for forming a plurality of lenticules, wherein the touch sensing layer is disposed on the lenticular surface.

15. The electronic device according to claim 9, wherein the parallax separating sheet comprises a first side and an opposing second side, the second side having a lenticular surface for forming a plurality of lenticules, wherein the touch sensing layer is spaced from the lenticular surface.

16. The electronic device according to claim 15, wherein the lenticular surface is arranged to face the display panel, and the touch sensing layer is disposed on the first side of the parallax separation sheet.

17. The electronic device according to claim 15, wherein the first side of the parallax separation sheet is arranged to face the display panel, and the optical plate further comprises a spacer located between the touch sensing layer and the lenticular surface.

18. The electronic device according to claim 15, wherein the lenticular surface is arranged to face the display panel, and the optical plate further comprises a spacer located between the first surface of the parallax separation sheet and the touch sensing layer.

* * * * *